(12) United States Patent
Yokino et al.

(10) Patent No.: US 7,680,366 B2
(45) Date of Patent: Mar. 16, 2010

(54) OPTICAL WAVEGUIDE CHIP AND METHOD OF MANUFACTURING THE SAME

(75) Inventors: Takafumi Yokino, Hamamatsu (JP); Katsumi Shibayama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 30 days.

(21) Appl. No.: 11/587,143

(22) PCT Filed: Apr. 21, 2005

(86) PCT No.: PCT/JP2005/007631
§ 371 (c)(1),
(2), (4) Date: Nov. 26, 2007

(87) PCT Pub. No.: WO2005/103777
PCT Pub. Date: Nov. 3, 2005

(65) Prior Publication Data
US 2008/0212919 A1 Sep. 4, 2008

(30) Foreign Application Priority Data
Apr. 22, 2004 (JP) .............................. 2004-127150

(51) Int. Cl.
*G02B 6/12* (2006.01)
(52) U.S. Cl. .............................. 385/14; 83/13; 385/129; 385/132
(58) Field of Classification Search .................... 385/14, 385/89–92, 2, 27, 37, 129–132; 83/13; 359/15, 359/17, 18, 558, 566, 573, 103
See application file for complete search history.

(56) References Cited
U.S. PATENT DOCUMENTS
6,136,668 A 10/2000 Tamaki et al.
(Continued)

FOREIGN PATENT DOCUMENTS
JP 8-162718 6/1996
(Continued)

*Primary Examiner*—Ellen Kim
(74) *Attorney, Agent, or Firm*—Drinker Biddle & Reath LLP

(57) ABSTRACT

The present invention relates to an optical waveguide chip, etc., having a structure for effectively avoiding or suppressing peeling of an optical waveguide layer in a process of cutting a wafer. The optical waveguide chip comprises a substrate having a main surface, and an optical waveguide layer formed on the main surface of the substrate. The optical waveguide layer comprises a cladding portion and a core portion that is disposed inside the cladding portion and that has a higher refractive index than the cladding portion, and at least one of side surfaces of the optical waveguide layer is positioned at a predetermined distance toward a center of the main surface from an edge of the main surface. This arrangement includes an arrangement having a thin film portion at a peripheral region that includes the edge of the main surface. In the case that the optical waveguide layer has the thin film portion at its periphery, the optical waveguide layer has a side surface that coincide with the side surface of the substrate including the edge of the main surface and a side surface that is separated by a predetermined distance from edge of the main surface. By this arrangement, when cutting a wafer into chip units, even if chipping occurs at an edge of the main surface of the substrate to be cut, peeling of the optical waveguide layer, formed on the substrate, is suppressed effectively.

17 Claims, 23 Drawing Sheets

U.S. PATENT DOCUMENTS

| | | | |
|---|---|---|---|
| 6,228,670 B1 * | 5/2001 | Kudo | 438/31 |
| 6,445,857 B1 * | 9/2002 | Korenaga et al. | 385/52 |
| 7,010,199 B2 * | 3/2006 | Kim et al. | 385/49 |
| 7,013,055 B2 * | 3/2006 | Hayamizu et al. | 385/14 |
| 2003/0194192 A1 | 10/2003 | Ido et al. | |
| 2004/0026803 A1 * | 2/2004 | Yatsuda et al. | 264/1.27 |
| 2004/0057653 A1 * | 3/2004 | Fukuda et al. | 385/14 |
| 2005/0116792 A1 * | 6/2005 | Moon et al. | 333/161 |

FOREIGN PATENT DOCUMENTS

| | | |
|---|---|---|
| JP | 11-337757 | 12/1999 |
| JP | 2002-22993 | 1/2002 |
| WO | WO 98/13862 | 4/1998 |

* cited by examiner (a)

(b)

(a)

(b)

(c)

(d)

(a)

(b)

(c)

(d)

(a)

(b)

(c)

(a)

(b)

(c)

(a)

(b)

(a)

(b)

(a)

(b)

OPTICAL WAVEGUIDE CHIP AND METHOD OF MANUFACTURING THE SAME

TECHNICAL FIELD

The present invention relates to an optical waveguide chip and a method of manufacturing the same.

BACKGROUND ART

Optical waveguide chips are used to branch or couple light that propagates through optical fibers and other light transmitting media. For example, an embedded type of optical waveguide chip has, on a substrate, formed of Si, etc., a polymer optical waveguide layer, which includes a core that guides light and a cladding that covers the core. Such optical waveguide chips are manufactured, for example, by the following method. First, a lower cladding layer is formed on a Si wafer. A core layer, with a higher refractive index than the lower cladding layer, is then formed to an arbitrary planar shape on the lower cladding layer by a photolithography technique or an etching technique. An upper cladding layer is then formed so as to cover the core layer. Optical waveguide chips are then obtained by cutting the Si wafer, on which the lower cladding layer, the core layer, and the upper cladding layer have been formed, along predetermined lines into chips.

As an art for cutting a Si wafer into chips in a method of manufacturing such optical waveguide chips, there is, for example, an optical waveguide chip manufacturing method disclosed in a Patent Document 1. FIG. 1 is a diagram for explaining this method. In this method, after an optical waveguide 102 is formed on a wafer substrate 101, parts of the optical waveguide 102 and the substrate 101 are cut by a dicing blade 103. By this cutting, an end surface 102a of the optical waveguide 102 is formed, and a step 101b, having a side surface that is coplanar to the end surface 102a of the optical waveguide 102, is formed on the substrate 101. In the Patent Document 1, it is indicated that abrasive grains, formed by the cutting of the substrate 101, become fine particles by being pulverized finely between the substrate 101 and the dicing blade 103, and an action of polishing the optical waveguide end surface 102 is provided by the fine particles. It is also indicated in the Patent Document 1 that when full-cut dicing of the substrate (cutting of the substrate fully in a thickness direction) is performed by the dicing blade 103, larger chipping (nicking) occurs in comparison to performing half-cut dicing (cutting of the substrate partially in the width direction and leaving of a portion of the substrate in the width direction) by the dicing blade 103 and consequently, the optical waveguide end surface becomes flawed and the optical waveguide becomes peeled readily. The manufacturing method according to the Patent Document 1 thus intends to form a better optical waveguide end surface by controlling the polishing action by the abrasive grains according to the depth of cutting of the substrate by the dicing blade 103.

Patent Document 1: Japanese Patent Application Laid-Open No. H11-337757

DISCLOSURE OF THE INVENTION

Problems that the Invention is to Solve

The inventors have studied conventional optical waveguide chip manufacturing method in detail, and as a result, have found problems as follows. That is, in the conventional optical waveguide chip manufacturing method disclosed in the Patent Document 1, when a wafer, formed of Si or other comparatively hard material, is cut by dicing, chipping may occur at cut surfaces of the wafer. An optical waveguide layer may then become peeled from a top surface of the wafer due to the chipping of the wafer. The area (a) of FIG. 2 is an outer appearance photograph showing the manner in which an optical waveguide layer 105, composed of a polymer, became peeled off when a Si wafer 104, having the optical waveguide layer 105 formed on a top surface, was diced. The area (b) of FIG. 2 is a photograph of cut surfaces of the Si wafer 104 and the optical waveguide layer 105 shown in the area (a) of FIG. 2. As can be understood from the respective photographs of FIG. 2, when the wafer 104 is cut by the conventional dicing method, the optical waveguide layer 105 may become peeled from the top surface of the wafer 104 due to chipping.

In order to overcome the above-mentioned problems, it is an object of the present invention to provide an optical waveguide chip, having a structure for effectively avoiding or suppressing the peeling of an optical waveguide layer when a wafer is cut, and a method of manufacturing this optical waveguide chip.

Means for Solving the Problems

An optical waveguide chip according to the present invention comprises a substrate having a main surface, and an optical waveguide layer that is formed on the main surface of the substrate and that has a core portion guiding light. Particularly, in order to resolve the above problems, in this optical waveguide chip, at least one of side surfaces of the optical waveguide layer is positioned at a predetermined distance toward a center of the main surface from an edge of the main surface.

In the optical waveguide chip with the above structure, since at least one of the side surfaces of the optical waveguide layer is positioned nearer the center of the main surface than are substrate side surfaces that include edges of the main surface, when a wafer, on which the optical waveguide layer has been formed, is cut into chip units, even if nicks and cracks form due to chipping at the edges of the main surface (that is, a cut portion of the wafer), the effects of the chipping do not reach the optical waveguide layer readily. Thus, in the optical waveguide chip according to the present invention, the peeling of the optical waveguide layer in the process of cutting the wafer can be avoided or suppressed effectively.

In the optical waveguide chip according to the present invention, a peripheral region of the main surface of the substrate does not have to be covered by the optical waveguide layer. In this case, in the optical waveguide chip, the area of a contact region of the optical waveguide that contacts the main surface is less than the area of the entire main surface. Thus, in this optical waveguide chip, by the region that is not covered by the optical waveguide layer being present along the edges of the main surface, the effects of chipping on the optical waveguide layer are reduced effectively when the wafer, on which the optical waveguide layer has been formed, is cut into chip units, and the peeling of the optical waveguide layer in the process of cutting the wafer is avoided or suppressed favorably.

The optical waveguide chip with the above structure can be obtained by the steps of: forming an optical waveguide layer, having a core portion that guides light, on a wafer whose portion becomes a substrate; removing a part of the optical waveguide layer that cover a region of a top surface of the wafer that include a scheduled cutting line; and then cutting the wafer so as to partition the region along the scheduled cutting line. In the optical waveguide chip that is thus manufactured, since in the process of wafer cutting, the wafer is cut so as to partition the region on the main surface from which the part of the optical waveguide layer have been removed, the effects of chipping on the optical waveguide layer are reduced effectively and the peeling of the optical waveguide layer in the process of cutting the wafer is avoided or suppressed favorably.

In the optical waveguide chip according to the present invention, a minimum distance from the side surface of the optical waveguide layer that coincide with the light entry/exit end of the core portion to the edge of the main surface is preferably less than a minimum distance from the other side surfaces of the optical waveguide layer to the edge of the main surface. In this arrangement, when a light entry/exit end of the core portion is coupled to an optical fiber or other optical part, a distance between the light entry/exit end and a side surface of the optical part that is put in contact with a substrate side surface is shortened and coupling loss can be reduced effectively. Also, when the optical waveguide chip is held by forceps, etc., since the substrate side surface along the region, having a comparatively large width from the edge of the main surface, is held, damaging of the optical waveguide layer is prevented.

Furthermore, in the optical waveguide chip according to the present invention, the optical waveguide layer may have a thin film portion, being thinner than a central portion of the optical waveguide layer and positioned on an outer peripheral region that includes the edge of the main surface of the substrate. In this case, the optical waveguide layer has a side surface, coinciding with the substrate side surface that include the edge of the main surface, and a side surface, positioned at the predetermined distance toward the center of the main surface from the edge of the main surface. The present inventors made the finding that the thinner the optical waveguide layer near the portion that is cut in the wafer cutting process, the less likely the peeling of the optical waveguide layer from the top surface of the wafer during wafer cutting. Since the region in contact with the edges of the main surface is covered by the thin film portion of the optical waveguide layer, the peeling of the optical waveguide layer due to chipping in the process of cutting the wafer, on which the optical waveguide layer has been formed, in chip units can be avoided or suppressed favorably with the present optical waveguide chip as well.

The optical waveguide chip with the above structure can be obtained by forming an optical waveguide layer, with a core portion that guides light, on a wafer, forming a thin film portion, which is thinner than other portions of the optical waveguide layer, on a portion of the optical waveguide layer covering a region of a top surface of the wafer that includes a scheduled cutting line, and then cutting the wafer so as to partition the thin film portion along the scheduled cutting line. In the optical waveguide chip that is thus manufactured, since in the process of wafer cutting, the wafer is cut so as to partition the thin film portion, the peeling of the optical waveguide layer due to chipping is avoided or suppressed favorably.

In the optical waveguide chip with the above structure, the thickness of the thin film portion is preferably less than an interval between the core portion and the main surface. By the thickness of the thin film portion being set thus, the peeling of the optical waveguide layer due to chipping can be avoided or suppressed more effectively. In this specification, the relationship between the interval from the core portion to the main surface and the thickness of the thin film portion refers to the relationship between the interval from the core portion to the main surface and the thickness of the thin film portion in an arbitrary cross section of the optical waveguide chip.

In the optical waveguide chip according to the present invention, a width of each of thin film portions, respectively positioned between side surfaces of the optical waveguide layer coinciding with the light entry/exit end of the core portion and the edge of the main surface, is preferably less than a width of the thin film portion, respectively positioned between the other side surfaces of the optical waveguide layer and the edge of the main surface. In this arrangement, when a light entry/exit end of the core portion is coupled to an optical fiber or other optical part, a distance between the light entry/exit end and a side surface of the optical part that is in contact with a substrate side surface is shortened and coupling loss can be reduced effectively. Also, when the optical waveguide chip is held by forceps, etc., since the substrate side surface along the thin film portion, having a comparatively large width from the edge of the main surface, is held, damaging of the optical waveguide layer is prevented effectively.

In the optical waveguide chip according to the present invention, the optical waveguide layer preferably contains a polymer. When an optical waveguide layer contains a polymer, since optical waveguide layer becomes soft in comparison to a substrate, the optical waveguide layer becomes peeled readily due to chipping during wafer cutting. In contrast, in accordance with the optical waveguide chip according to the present invention that has the above-described structure, the peeling of the optical waveguide layer can be avoided or suppressed favorably even when the optical waveguide layer contains a polymer.

An optical waveguide chip manufacturing method according to the present invention includes a cutting step of cutting a wafer, having an optical waveguide layer with a core portion that guides light, along a scheduled cutting line. In particular, this cutting step includes a step of removing at least a portion of the optical waveguide layer that covers a region of the top surface of the wafer that include the scheduled cutting line, and a step of cutting the wafer so as to partition the region along the scheduled cutting line.

In this manufacturing method, since in cutting the wafer, the wafer is cut so as to partition the regions of the wafer top surface, in which at least a portion of the optical waveguide layer has been removed, even if nicks and cracks form due to chipping in the cutting process, the effects thereof are not likely to reach the optical waveguide layer. Thus, in accordance with the optical waveguide chip manufacturing method according to the present invention, the peeling of the optical waveguide layer during wafer cutting can be avoided or suppressed favorably.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effects of the Invention

In accordance with the optical waveguide chip and method of manufacturing the same according to the present invention, the peeling of an optical waveguide layer in a process of cutting a wafer can be avoided or suppressed effectively.

Figure 1:
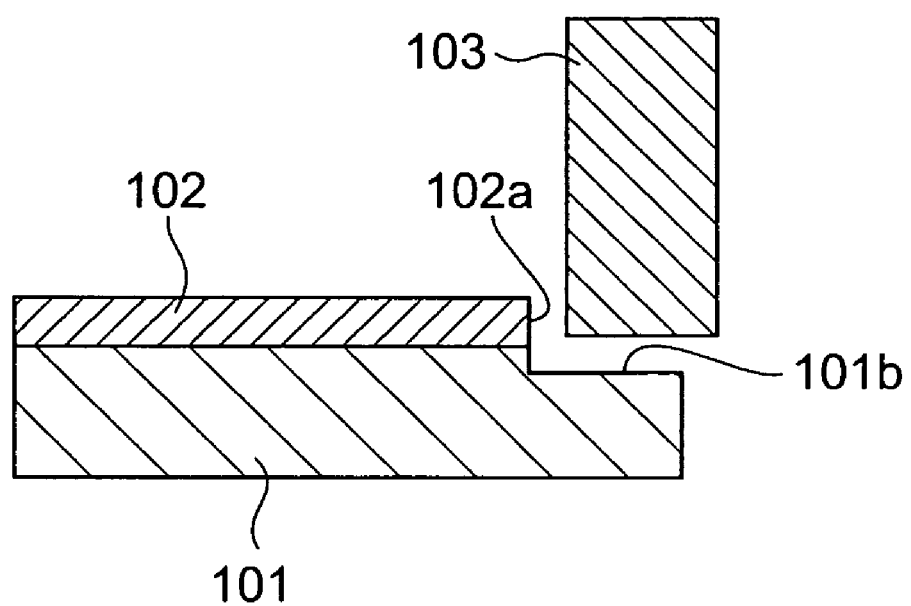
FIG. 1 is a diagram for explaining a conventional method of manufacturing an optical waveguide chip.

DESCRIPTION OF THE REFERENCE NUMERALS 1, 1a to 1c . . . optical waveguide chip; 3 . . . substrate; 4 . . . wafer; 5, 8, 11, 13 . . . optical waveguide layer; 6, 14, 15, 17 . . . cladding portion; 7, 9, 18 . . . core portion; 10 . . . wafer product; 11c, 13c, 51 . . . thin film portion; 19 . . . cladding layer; 19a . . . lower cladding layer; 19b . . . upper cladding layer; 20 . . . optical waveguide layer; 61 to 64 . . . dicing blade; and 66 . . . ion.

BEST MODES FOR CARRYING OUT THE INVENTION

Figure 2:
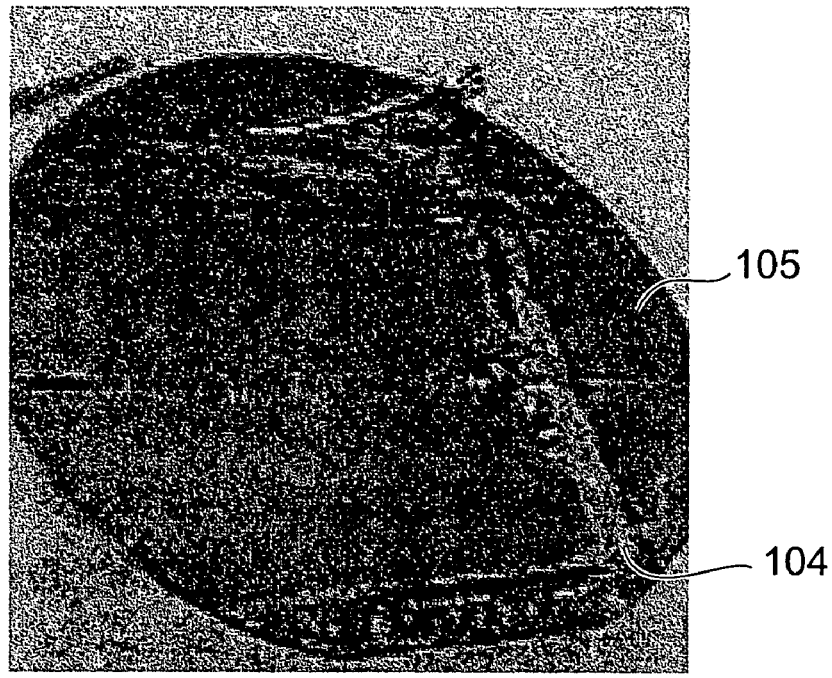
FIG. 2 shows photographs of a state of an optical waveguide layer, composed of a polymer, when a Si wafer, having the optical waveguide layer formed on a top surface, is diced by a conventional method.
Figure 2:
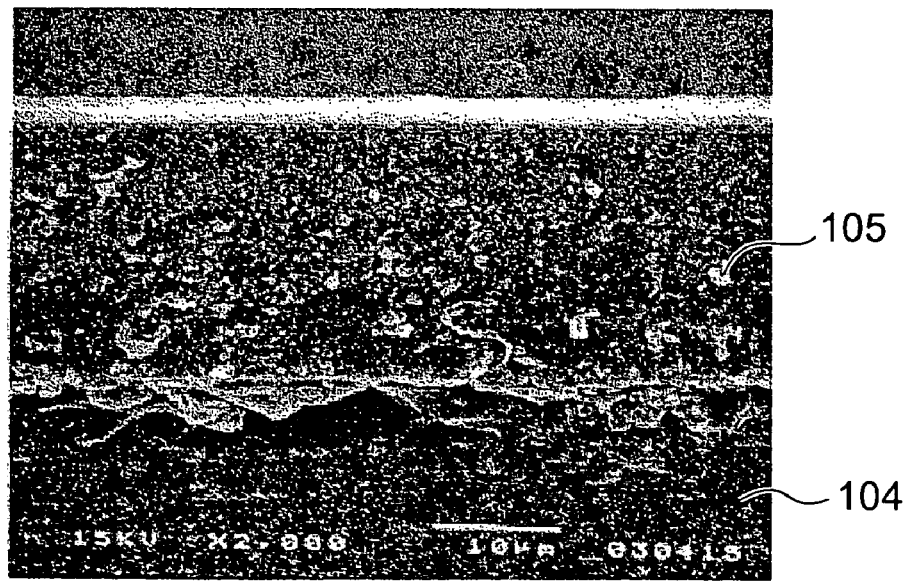

In the following, embodiments of optical waveguide chips and manufacturing methods for the same according to the present invention will be explained in detail with reference to FIGS. 3 to 23. In the explanation of the drawings, constituents identical to each other will be referred to with numerals identical to each other without repeating their overlapping descriptions. FIGS. 1 and 2, described above, shall also be referenced as necessary.

First Embodiment

Figure 3:
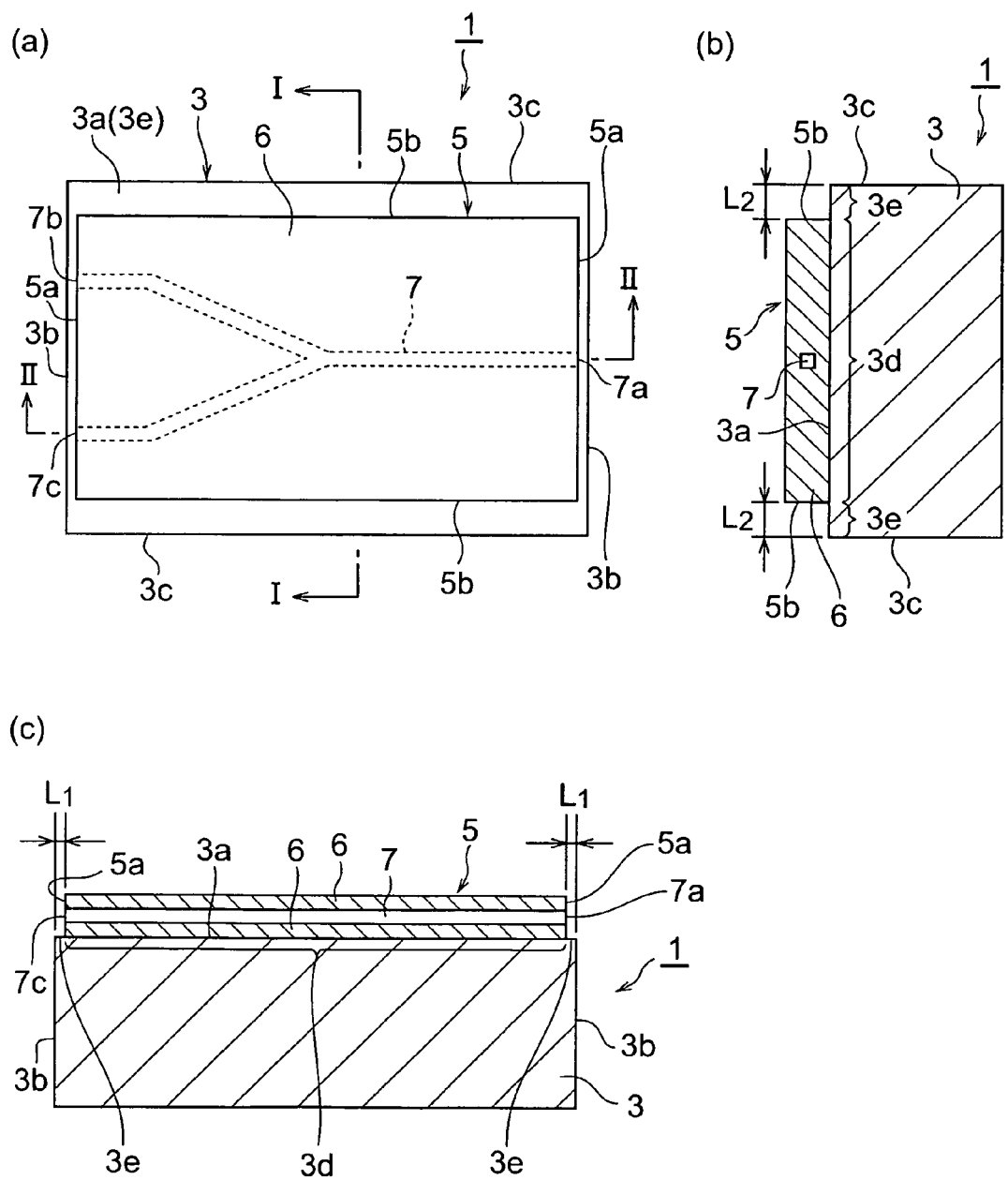
FIG. 3 shows diagrams of an arrangement of a first embodiment of an optical waveguide chip according to the present invention.
Figure 4:
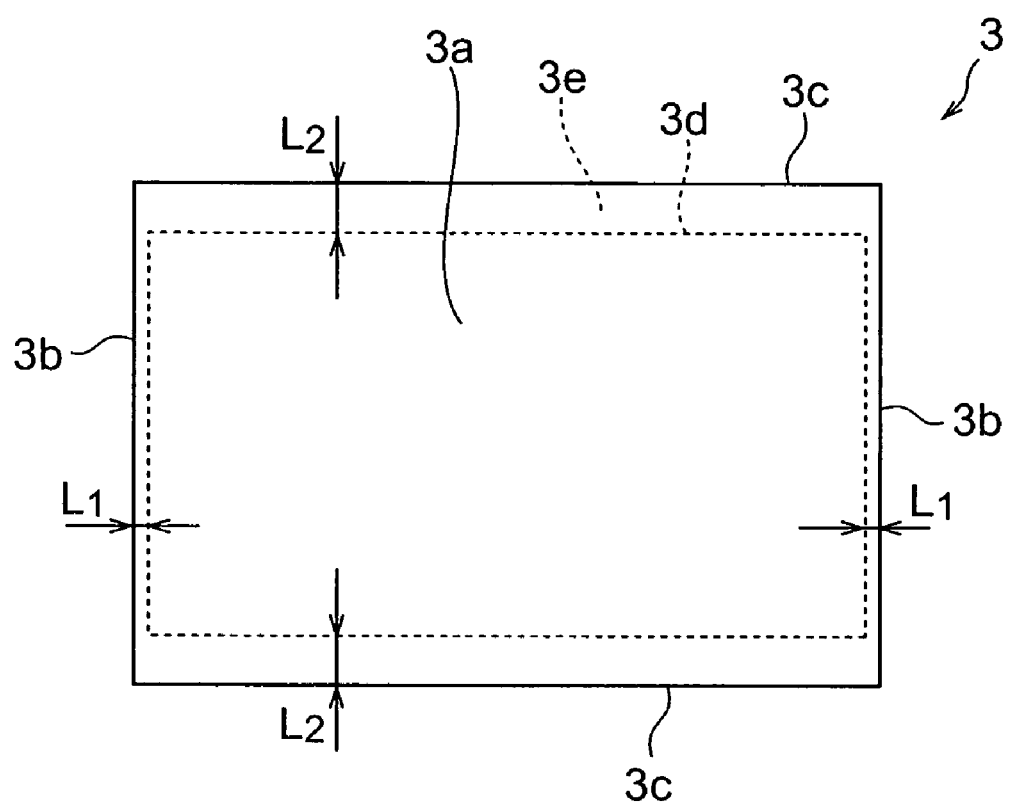
FIG. 4 is a plan view of a main surface of a substrate of the optical waveguide chip according to the first embodiment.

A first embodiment of an optical waveguide chip and a method of manufacturing the same according to the present invention will first be explained. FIG. 3 shows diagrams of an arrangement of the first embodiment of the optical waveguide chip according to the present invention. The area (a) of FIG. 3 shows a plan view of the optical waveguide chip according to the first embodiment, and the area (b) of FIG. 3 shows a sectional view of the optical waveguide chip 1 along a section I-I in the area (a) of FIG. 3. The area (c) of FIG. 3 is a sectional view of the optical waveguide chip 1 along a section II-II in the area (a) of FIG. 3. The section II-II is set along a core portion 7 provided in the optical waveguide chip 1. FIG. 4 is a plan view of a main surface 3a of a substrate 3 of the optical waveguide chip 1 according to the first embodiment. The optical waveguide chip 1 according to the first embodiment is a so-called embedded optical waveguide chip.

Referring now to the areas (a) to (c) of FIG. 3 and FIG. 4, the optical waveguide chip 1 according to the first embodiment has the substrate 3 and an optical waveguide layer 5. The substrate 3 can be formed using a material, such as silicon, silica, glass epoxy, ceramic, polyimide, etc. The substrate 3 has a rectangular planar shape and has a main surface 3a, a pair of side surfaces 3b and another pair of side surfaces 3c. As shown in FIG. 4, the main surface 3a has a region 3e that is adjacent to edges of the main surface 3a and a region 3d that occupies a portion of the main surface 3a besides the region 3e. In the first embodiment, the region 3e surrounds the region 3d.

The optical waveguide layer 5 is disposed on the region 3d of the main surface 3a of the substrate 3. That is, the optical waveguide layer 5 is disposed on the region besides the region 3e of the main surface 3a of the substrate 3, and the region 3e is not covered by the optical waveguide layer 5. The optical waveguide layer 5 is formed to a rectangular shape having a pair of side surfaces 5a and another pair of side surfaces 5b. By the optical waveguide layer 5 being disposed on the region besides the region 3e, the side surfaces 5a and 5b are positioned nearer a center of the substrate 3 than are the corresponding side surfaces 3b and 3c of the substrate 3. In other words, the side surfaces 5a and 5b are disposed at positions that are set back from the side surfaces 3b and 3c, respectively, of the substrate 3.

The optical waveguide layer 5 includes a cladding portion 6 and a core portion 7 that is higher in refractive index than the cladding portion 6. The cladding portion 6 is formed as a layer on the region 3d of the main surface 3a of the substrate 3, and the core portion 7 is formed inside the cladding portion 6. The core portion 7 has a Y-like planar shape that joins the pair of side surfaces 5a of the optical waveguide layer 5. Of the pair of side surfaces 5a, one of the side surfaces 5a functions as a light entry/exit end 7a and the other side surface 5a functions as two light entry/exit ends 7b and 7c. The core portion 7 can branch light that enters from the light entry/exit end 7a and make the branched light exit from each of the light entry/exit ends 7b and 7c. The core portion 7 can also couple light entering from each of the light entry/exit ends 7b and 7c and make the coupled light exit from the light entry/exit end 7a.

Here, in the region 3e adjacent the edges of the main surface 3a, a width $L_1$, of each of portions extending along the side surfaces 5a of the optical waveguide layer 5 that coincide with the light entry/exit ends 7a to 7c of the core portion 7, is set to be less than a width $L_2$ of each of portions extending along the other side surfaces 5b. In other words, the setback width $L_1$ of each of the side surfaces 5a of the optical waveguide layer 5, coinciding with the light entry/exit ends 7a to 7c of the core portion 7, with respect to the corresponding side surface 3b of the substrate 3 is set to be less than the setback width $L_2$ of each of other side surfaces 5b with respect to the corresponding side surface 3c.

As examples of the material making up the optical waveguide layer 5, organic-based polymers, having polyimide, benzocyclobutene resin, silicone, polymethylmethacrylate (PMMA), epoxy, acrylate, etc., as a main resin, and inorganic-based materials, such as silica, $LiNbO_3$, $LiTaO_3$, $ZnO$, $Nb_2O_5$, $Ta_2O_5$, $Si_3N_4$, YIG ($Y_3Fe_5O_{12}$), etc., can be cited. The above-mentioned organic-based materials include materials, with which the H of C—H groups of the respective materials given above are replaced by fluorine or deuterium.

Figure 5:
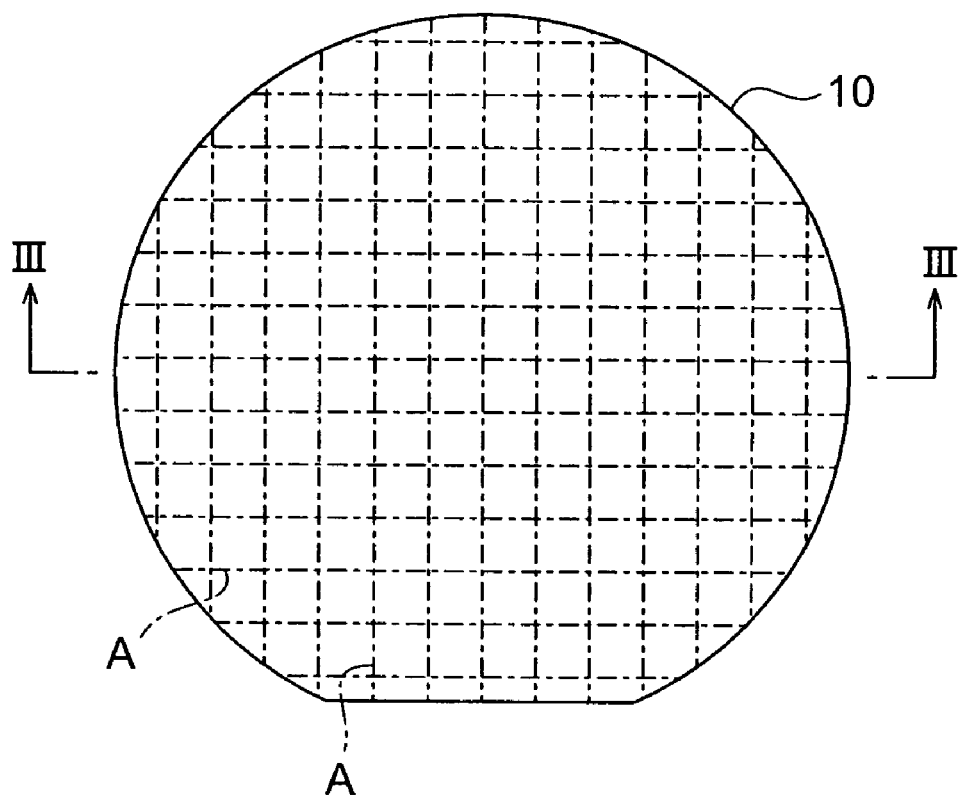
FIG. 5 is a plan view of a wafer product used to manufacture optical waveguide chips.
Figure 6:
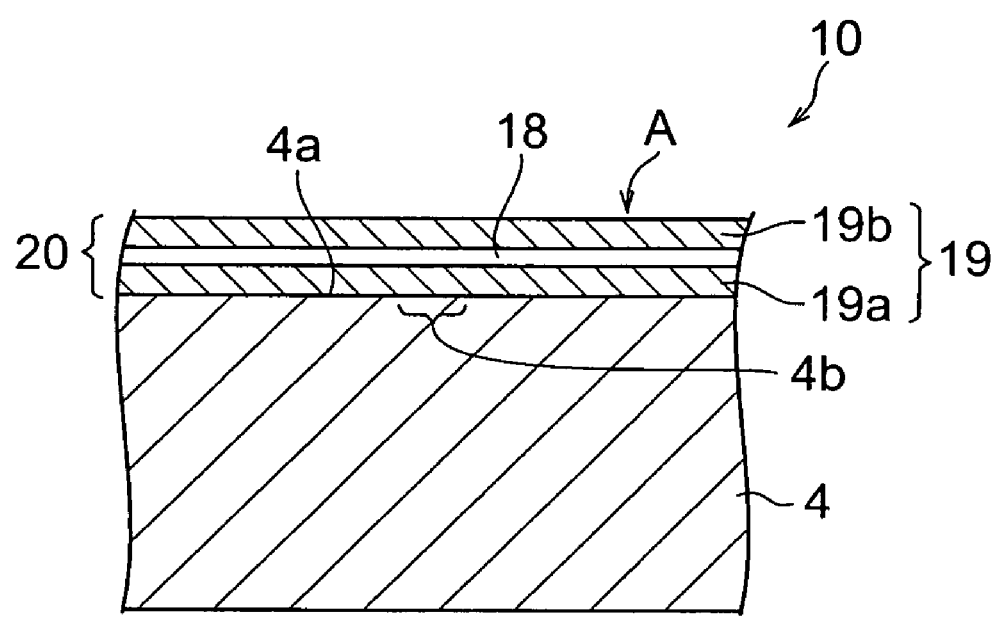
FIG. 6 is an enlarged sectional view along a section III-III of the wafer product shown in FIG. 5.

A method of manufacturing the optical waveguide chip 1 according to the first embodiment will now be explained with reference to FIGS. 5 to 8. FIG. 5 is a plan view of a wafer product 10 used for manufacturing the optical waveguide chips 1, and FIG. 6 is an enlarged sectional view of the wafer product 10 along a section III-III shown in FIG. 5. FIG. 6 is a sectional view along a longitudinal direction of a core portion 18 included in an optical waveguide layer 20. Referring now to FIG. 5, scheduled cutting lines A are defined hypothetically on the wafer product 10. The scheduled cutting lines A are mutual boundaries of the optical waveguide chips, which are manufactured by cutting the wafer product 10 into chips, and are hypothetical lines that are defined hypothetically on the wafer product 10.

Referring now to FIG. 6, the wafer product 10 has a wafer 4, formed of Si, etc. On a main surface 4a of wafer 4, regions 4b, each extending along a scheduled cutting line A, are defined hypothetically. The wafer product 10 also has the optical waveguide layer 20 formed on the main surface 4a of the wafer 4. The optical waveguide layer 20 has a core portion 18 and a cladding layer 19. The wafer product 10 is manufactured as follows. First, after cleaning the main surface 4a of the wafer 4, a lower cladding layer 19a, which is a portion of the cladding layer 19, is formed on the main surface 4a. An above-mentioned organic-based polymer or inorganic-based material is used as the material of the lower cladding layer 19a. A core layer of higher refractive index than the lower cladding layer 19a is laminated onto the lower cladding layer 19a, and the core layer is exposed, developed, and etched to an arbitrary shape (a Y-like shape in the present embodiment) by a photolithography technique or etching technique, etc., to form the core portion 18. Lastly, an upper cladding layer 19b, formed of the same material as the lower cladding layer 19a, is laminated so as to cover the core portion 18 and the lower cladding layer 19a. The wafer product 10 is thereby completed. When the optical waveguide layer 20 is composed of a polymer, the optical waveguide layer 20 is preferably formed comparatively thickly to prevent the entry of voids (cavities).

Figure 7:
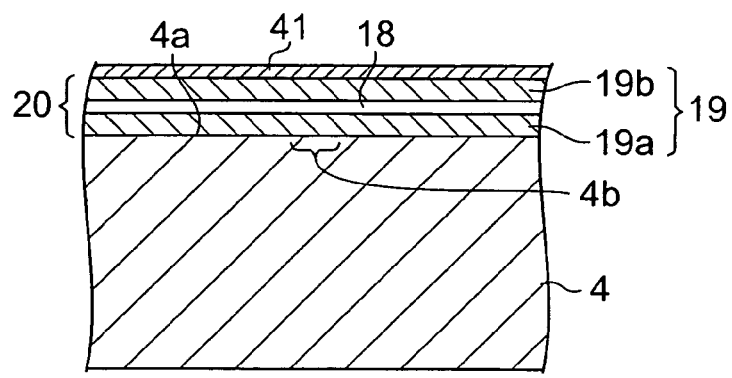
FIG. 7 shows diagrams for explaining an example of manufacturing the optical waveguide chip according to the first embodiment (Part 1)
Figure 7:
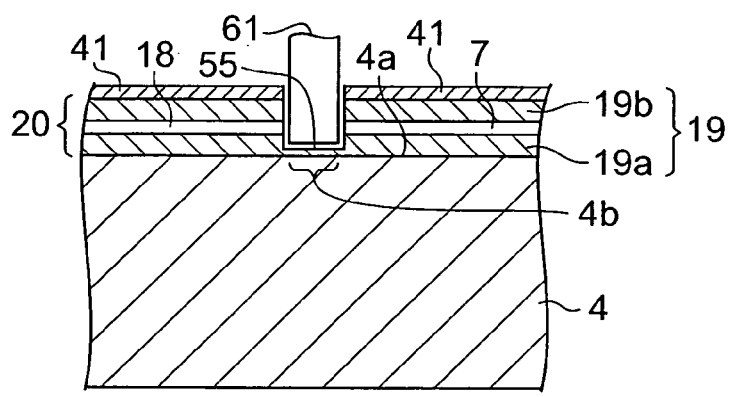
Figure 7:
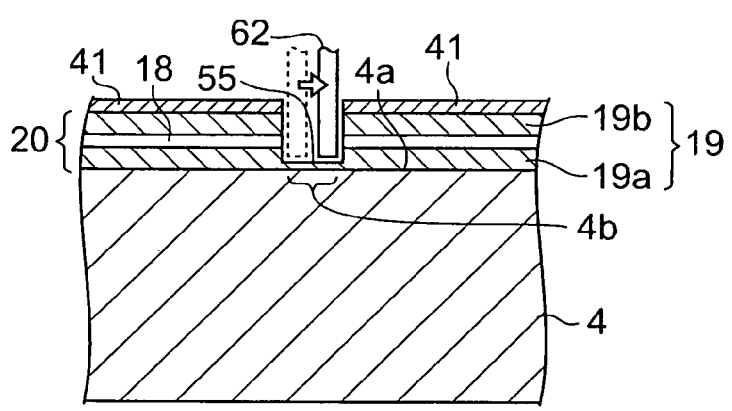
Figure 7:
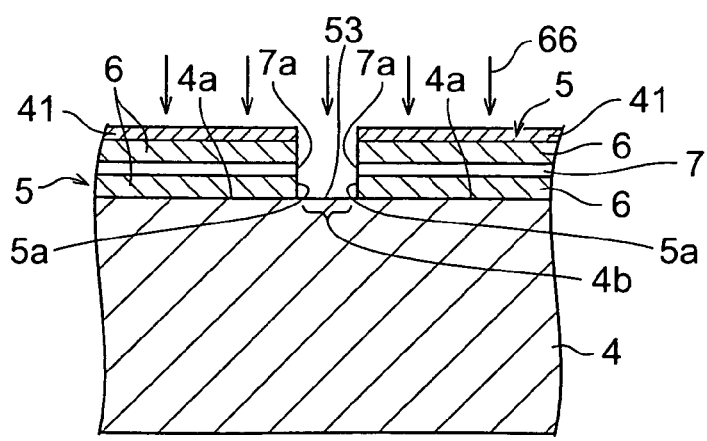

First, as shown in the area 5(a) of FIG. 7, a mask 41 is formed on the upper cladding layer 19b. The mask may be a general photoresist, an $O_2$-resistant resist, or a metal thin film of Al, etc. Then, as shown in the area (b) of FIG. 7, a groove 55, having a bottom at the lower cladding layer 19a, is formed by a dicing blade 61. Here, the groove 55 is formed so that a bottom surface of the groove 55 is positioned on a region 4b of the main surface 4a of wafer 4 and a width of the bottom surface of the groove 55 is substantially equal to a width of the region 4b. As the dicing blade 61, a blade of a thickness that is in accordance with the width of the region 4b of the main surface 4a is used. Or, a thin dicing blade 62, such as that shown in the area (c) of FIG. 5 may be used. In this case, the groove 55 having the width that is in accordance with the width of the region 4b is formed by repeating dicing upon moving the dicing blade 62 in the width direction of the region 4b.

Of the lower cladding layer 19a, a portion that is left at the bottom of the groove 55 (that is, a portion of the lower cladding layer 19a that is not covered by the mask 41) is removed, as shown in the area (d) of FIG. 7, by a dry etching method, such as reactive ion etching, with which ions 66 that are induced by discharge of a reactive gas are made to collide from the main surface 4a side of the wafer 4. Grooves 53 that separate the optical waveguide layer 20 along the scheduled cutting lines A are thus formed, and optical waveguide layers 5, each having the side surfaces 5a and 5b and including the core portion 7 and the cladding portion 6, are formed. Also, in this process, the light entry/exit ends 7a to 7c of the core portions 7 are formed. By the forming of the grooves 53 that separate the optical waveguide layers 5, the regions 4b along the scheduled cutting lines A on the main surface 4a of the wafer 4 become exposed.

Figure 8:
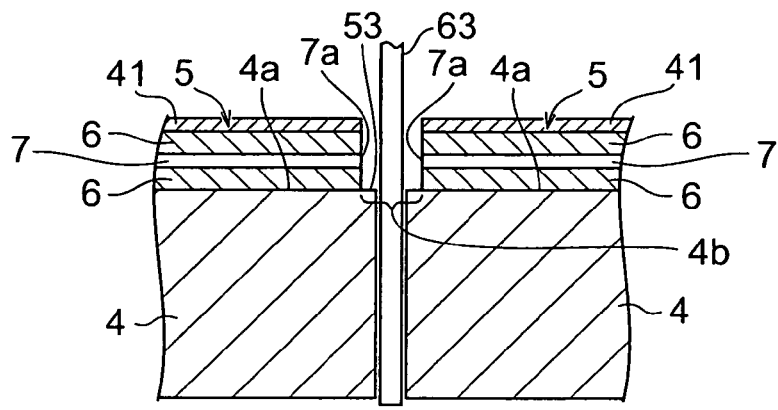
FIG. 8 shows diagrams for explaining the example of manufacturing the optical waveguide chip according to the first embodiment (Part 2)
Figure 8:
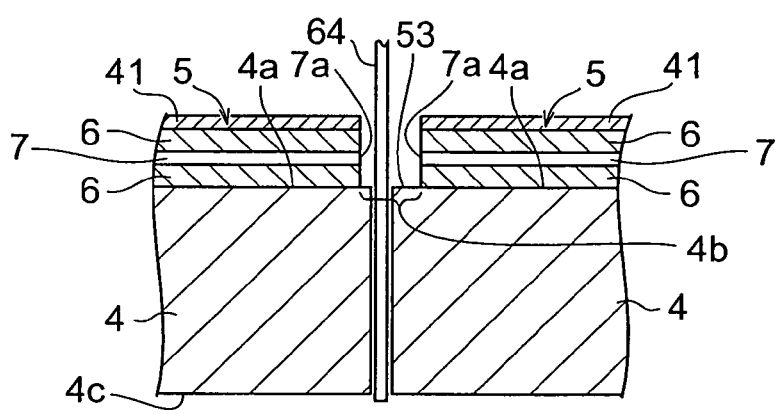
Figure 8:
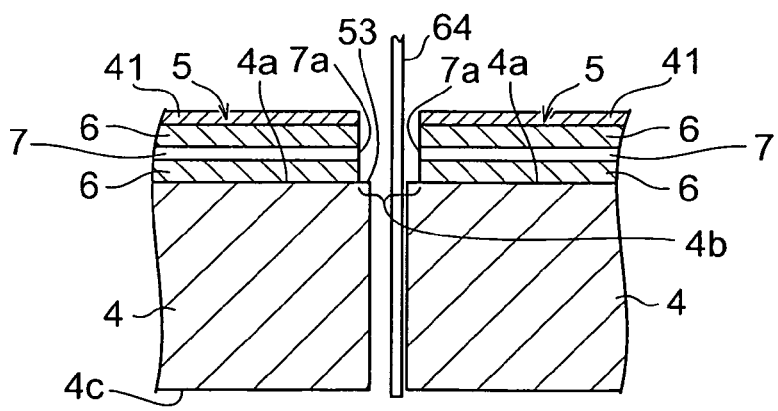
Figure 8:
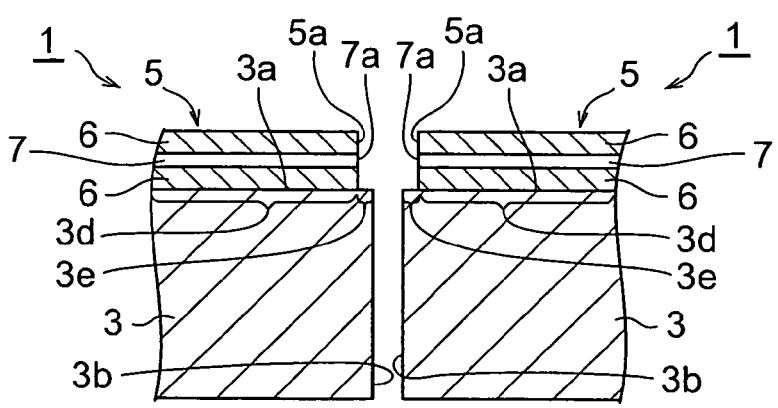

Then, as shown in the area (a) of FIG. 8, a dicing blade 63 that is thinner than the dicing blade 61 is used to cut the wafer 4. In this process, the wafer 4 is cut so as to partition each region 4b of the main surface 4a along the scheduled cutting line A. Or, the wafer 4 may be cut using an even thinner dicing blade 64 as shown in the areas (b) and (c) of FIG. 8. In this case, after cutting of the wafer 4 (see the area (b) of FIG. 8), the cutting of the wafer 4 is repeated upon moving the dicing blade 64 in a width direction of the region 4b to partition the region 4b at an arbitrary width (see the area (c) of FIG. 8). The wafer 4 is thus cut along the scheduled cutting lines A (see FIG. 5), and the substrates 3, each having the side surfaces 3b and 3c, are formed as shown in the area (d) of FIG. 8. By the above process, the optical waveguide chips 1, each having the substrate 3 and the optical waveguide layer 5, are completed. By being partitioned, each region 4b becomes the regions 3e of the main surfaces 3a of the corresponding optical waveguide chips 1. The region of each main surface 3a that is covered by the optical waveguide layer 5 becomes the region 3d.

Figure 9:
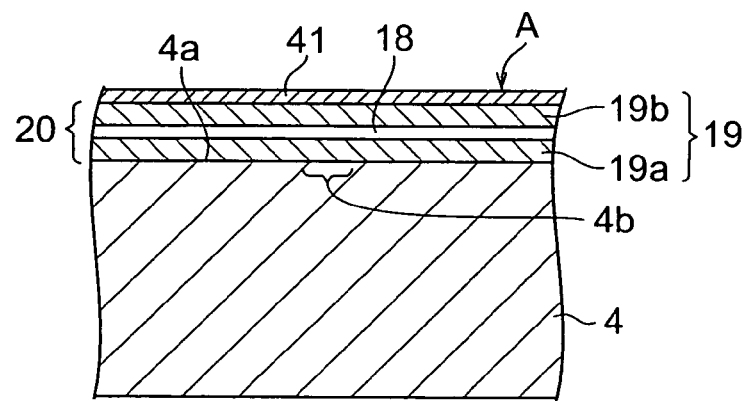
FIG. 9 shows diagrams for explaining another example of manufacturing the optical waveguide chip according to the first embodiment.
Figure 9:
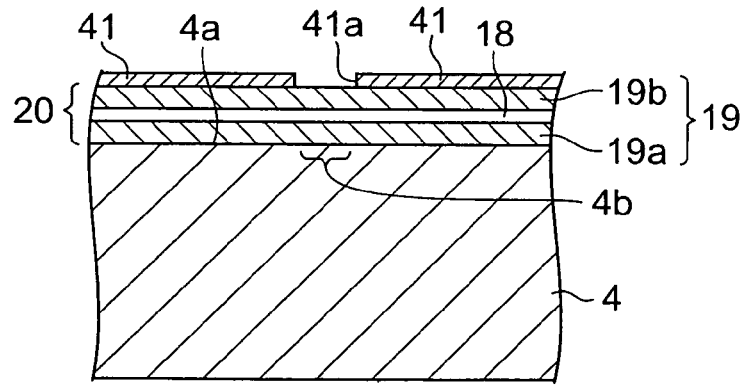
Figure 9:
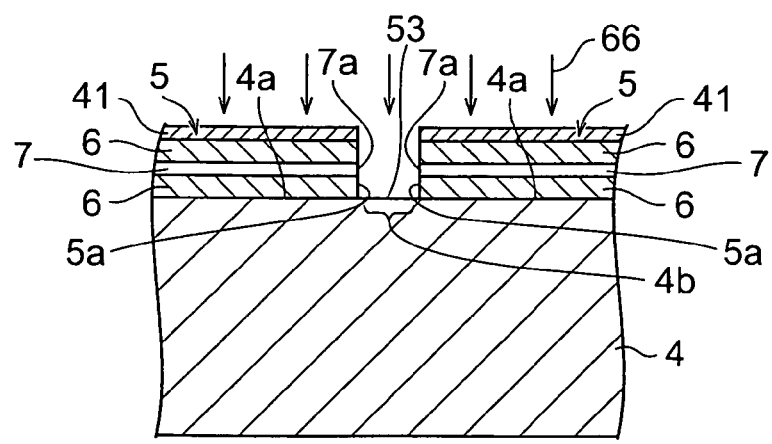

Another method of manufacturing the optical waveguide chips 1 will now be explained with reference to the areas (a)

to (c) of FIG. 9. The steps described here correspond to the steps of the above-described manufacturing method illustrated in the areas (a) to (d) of FIG. 7, and the other steps are the same as those of the above-described manufacturing method.

First, by the same method as the above-described manufacturing method, the wafer product, having the optical waveguide layer 20 on the wafer 4, is prepared. The mask 41 is then formed on the upper cladding layer 19b as shown in the area (a) of FIG. 9. Portions of the mask 41 that are positioned above the regions 4b of the main surface 4a of the wafer 4 are then removed as shown in the area (b) of FIG. 9 to form openings 41a in the mask 41. In this process, each opening 41a is formed so that its width is substantially the same as the width of each region 4b.

Of the optical waveguide layer 20, portions that are not covered by the mask 41 (that is, the portions corresponding to the openings 41a) are removed, as shown in the area (c) of FIG. 9, by a dry etching method, such as reactive ion etching, with which ions 66 that are induced by discharge of a reactive gas are made to collide from the main surface 4a side of the wafer 4. The grooves 53 that separate the optical waveguide layer 20 are thus formed, and optical waveguide layers 5, each having the side surfaces 5a and 5b and including the core portion 7 and the cladding portion 6, are formed. Also, in this process, the light entry/exit ends 7a to 7c of the core portions 7 are formed. The regions 4b along the scheduled cutting lines A on the main surface 4a of the wafer 4 become exposed.

Subsequently, by the same steps as those of the above-described manufacturing method (see the areas (a) to (d) of FIG. 8), the optical waveguide chips 1, each having the substrate 3 and the optical waveguide layer 5, are completed.

Effects of the optical waveguide chip 1 according to the first embodiment will now be explained. In cutting a wafer, on which an optical waveguide layer has been formed, and forming chips, the present inventors faced the phenomenon of peeling of the optical waveguide layer from the wafer. Upon examining this phenomenon, it was found that the peeling of the optical waveguide layer becomes more significant the deeper the cutting depth in the process of dicing a wafer. By further examination, it was found that fragments resulting from the chipping of the wafer push up the optical waveguide layer to make the optical waveguide layer become peeled from the wafer.

In contrast, with the optical waveguide chip 1 according to the first embodiment, the side surfaces 5a and 5b of the optical waveguide layer 5 are respectively positioned nearer the center of the substrate 3 than are the side surfaces 3b and 3c of the substrate 3. Thus, even if nicks and cracks due to chipping form at the edges of the main surface 3a (that is, at the cut portions of the wafer 4) in the process of cutting the wafer 4, on which the optical waveguide layer 5 has been formed, into chip units (see the areas (a) to (c) of FIG. 8), the effects thereof do not reach the optical waveguide layer 5 readily. Thus, with the optical waveguide chip 1, the peeling of the optical waveguide layer 5 in the process of cutting the wafer 4 can be avoided or suppressed effectively.

Figure 10:
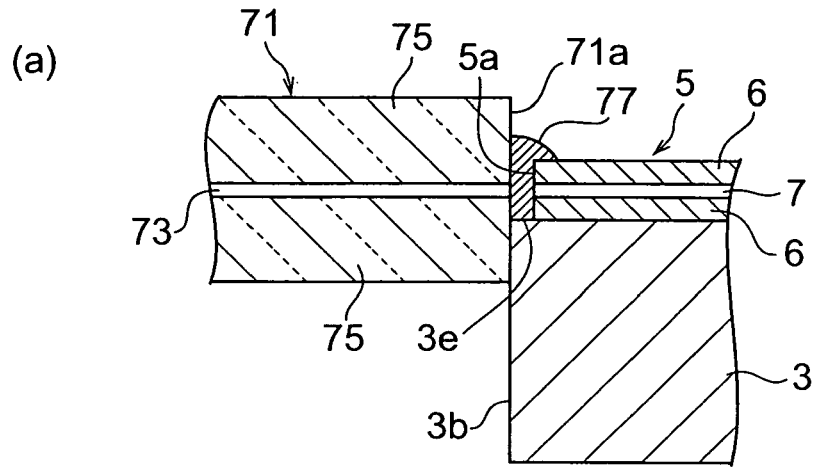
FIG. 10 shows diagrams for explaining an effect of the optical waveguide chip according to the first embodiment (Part 1)
Figure 10:
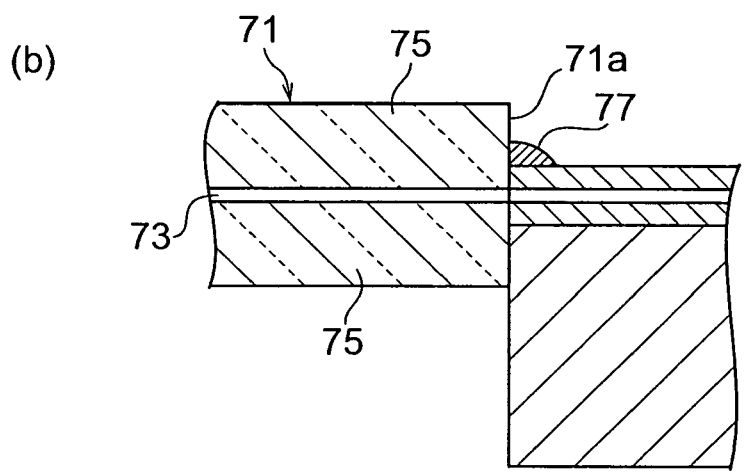
Figure 10:
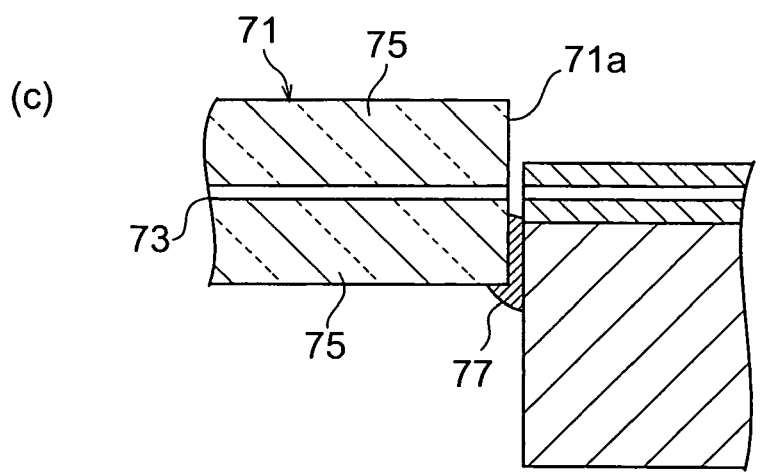

FIG. 10 shows diagrams for explaining another effect of the optical waveguide chip 1. In the optical waveguide chip 1, since the side surfaces 5a and 5b are respectively disposed nearer the center of the chip than are the side surfaces 3b and 3c, spaces adjacent the side surfaces 5a and 5b serve as adhesive agent reservoirs. That is, as shown in the area (a) of FIG. 10, when an optical part, such as an optical fiber 71, arranged from a core 73 and a clad 75, is to be coupled to the optical waveguide chip 1, by making a light-transmitting adhesive agent 77 flow into a space, formed between an end surface 71a of the optical fiber 71 and the side surface 5a of the optical waveguide layer 5, with the end surface 71a being put in contact with the side surface 3b of the substrate 3, the optical fiber 71 and the optical waveguide chip 1 are coupled favorably. Also, by making the refractive index of the adhesive agent 77 be of a value that is in-between the refractive index of the core 73 of the optical fiber 71 and the refractive index of the core portion 7 of the optical waveguide layer 5, coupling loss between the optical fiber 71 and the optical waveguide chip 1 is reduced.

In a case where a side surface of the optical waveguide layer and a side surface of the substrate are coincident (are coplanar), a problem that the adhesive agent 77 cannot be interposed between the core 73 of the optical fiber 71 and the core portion of the optical waveguide layer (see the area (b) of FIG. 10) or a problem that the adhesive agent 77 cannot stay between the core 73 of the optical fiber 71 and the core portion of the optical waveguide layer and droops downward (see the area (c) of FIG. 10) may occur. In contrast, in the optical waveguide chip 1, such problems do not occur, and the optical fiber 71 and the optical waveguide chip 1 can be coupled favorably.

Figure 11:
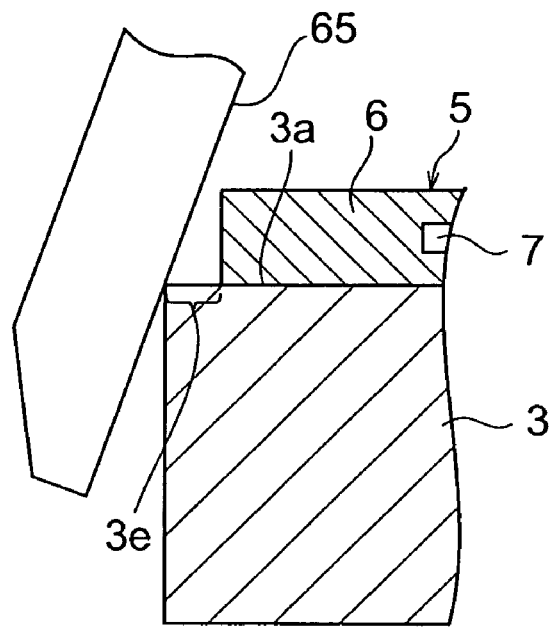
FIG. 11 shows diagrams for explaining an effect of the optical waveguide chip according to the first embodiment (Part 2)
Figure 11:
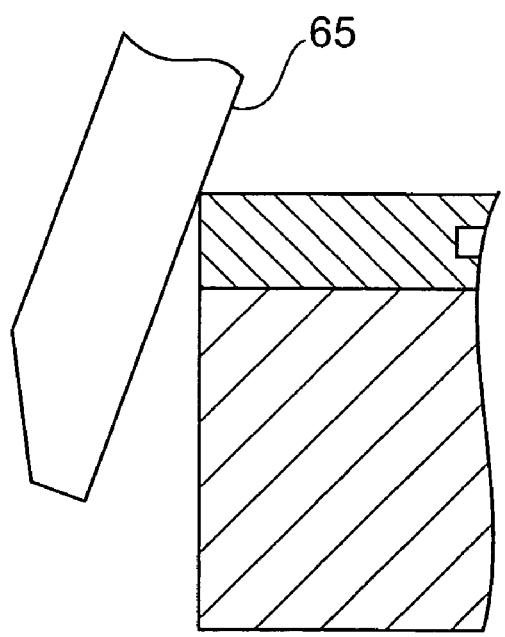

FIG. 11 shows partial sectional views for explaining yet another effect of the optical waveguide chip 1. In the optical waveguide chip 1, since the side surfaces 5a and 5b are respectively disposed nearer the center of the chip than are the side surfaces 3b and 3c, damaging of the optical waveguide layer 5 when the optical waveguide chip 1 is handled by forceps 65, etc., is prevented. In holding the optical waveguide chip 1 by the forceps 65, etc., the forceps 65 contact side surfaces of the optical waveguide chip 1 diagonally in many cases. Here, when the side surface of the optical waveguide layer coincides with the side surface of the chip, the forceps 65 contact the optical waveguide layer directly as shown in the area (b) of FIG. 11 and the optical waveguide layer may thus become damaged. In contrast, in the optical waveguide chip 1 according to the first embodiment, the contact of the optical waveguide layer 5 and the forceps 65 can be prevented as shown in the area (a) of FIG. 11. Thus, with the optical waveguide chip 1, the damaging of the optical waveguide layer 5 during handing of the optical waveguide chip 1 can be prevented.

In the first embodiment, in the main surface 3a, the region 3e that is not covered by the optical waveguide layer 5 is present adjacent the edges of the main surface 3a. Thus when cutting wafer 4, on which the optical waveguide layer 5 has been formed, into chip units, the effects of chipping on the optical waveguide layer 5 at the edges of the main surface 3a, that is, at the cut portions of the main surface 4a of the wafer 4 are reduced effectively, and the peeling of the optical waveguide layer 5 in the process of cutting the wafer 4 is avoided or suppressed favorably.

Also, in the optical waveguide chip 1 according to the first embodiment and the method of manufacturing the same, in cutting the wafer 4, on which the optical waveguide layer 5 has been formed, the wafer 4 is cut so as to partition the regions 4b, from each of which the 5 optical waveguide layer 5 on the main surface 4a has been removed. The effects of chipping of the wafer 4 on the optical waveguide layer 5 are thus reduced effectively, and the peeling of the optical waveguide layer 5 in the process of cutting the wafer 4 is avoided or suppressed favorably.

Figure 12:
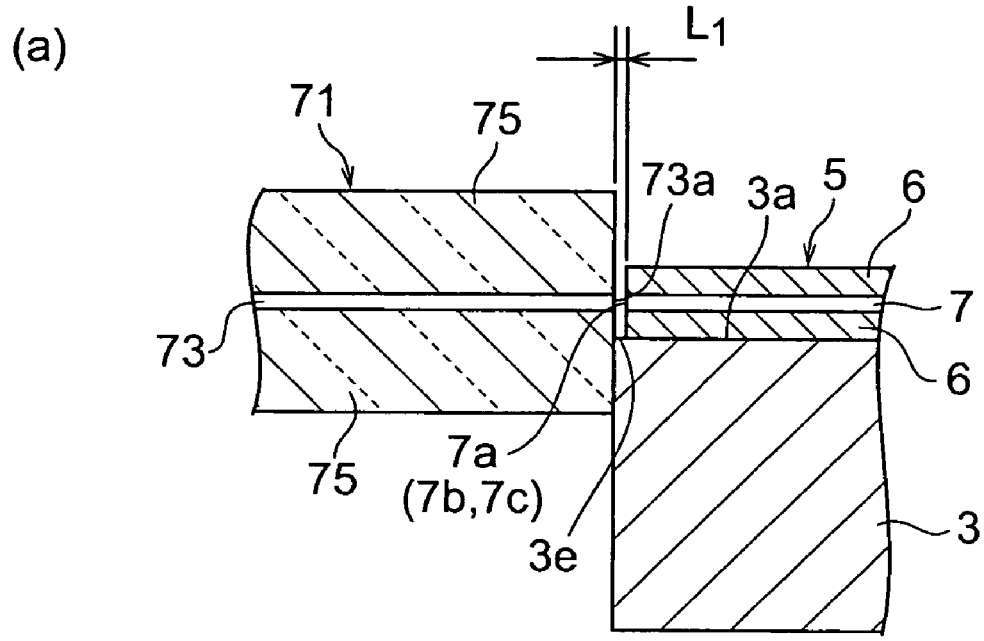
FIG. 12 shows diagrams for explaining an effect of the optical waveguide chip according to the first embodiment (Part 3)
Figure 12:
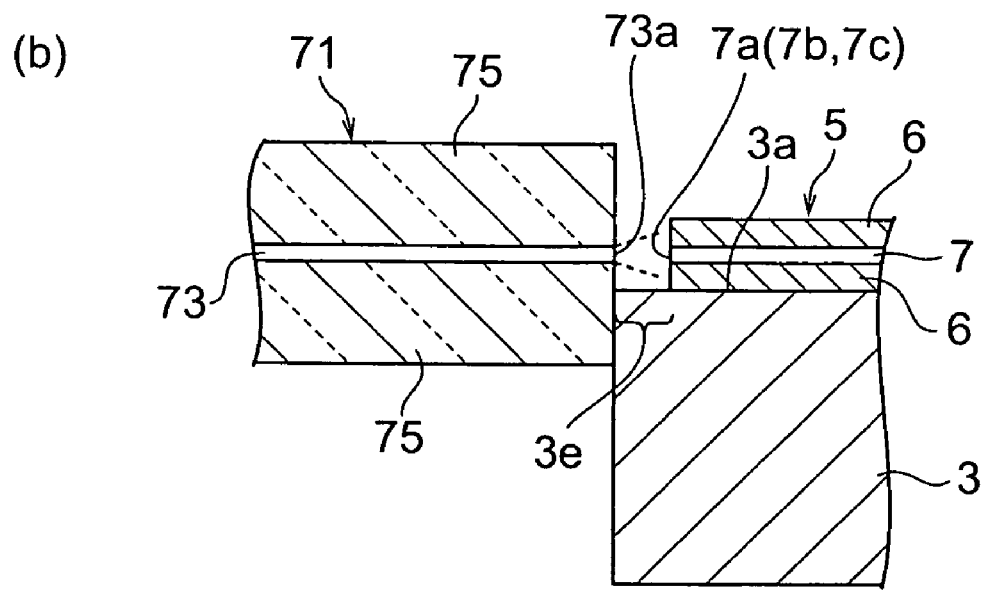

Furthermore, in the optical waveguide chip 1 of the first embodiment, in the region 3e of the main surface 3a of the substrate 3 that is not covered by the optical waveguide layer 5, the width $L_1$, from the edge of the main surface 3a, of the region 3e along the side surfaces Sa of the optical waveguide layer 5 having the light entry/exit ends 7a to 7c of the core portion 7 is preferably set to be less than the width $L_2$, from the edge of the main surface 3a, of the region 3e along the other side surfaces 5b of the optical waveguide layer 5. FIG. 12 shows diagrams for explaining effects of width $L_1$ being less than width $L_2$. When the width $L_1$ of the region 3e along the side surfaces 5a of the optical waveguide layer 5 is comparatively large, the distance between an end surface 73a of the core 73 of the optical fiber 71 and the light entry/exit end 7a (or 7b or 7c) of the core portion 7 of the optical waveguide layer 5 becomes large as shown in the area (b) of FIG. 12 and the light from the optical fiber 71 spreads before it enters the light entry/exit end 7a. The coupling loss between the optical fiber 71 and the optical waveguide layer 5 thus becomes large. On the other hand, in the optical waveguide chip 1 according to the first embodiment, since the width $L_1$ of the region 3e along the side surfaces 5a of the optical waveguide layer 5 is set to be comparatively small, the distance between the end surface 73a of the core 73 and the light entry/exit end 7a (or 7b or 7c) of the core portion 7 can be made small as shown in the area (a) of FIG. 12 and the coupling loss can be reduced.

The following effect is also provided by the width $L_1$ of the region 3e being less than the width $L_2$. That is, when holding the optical waveguide chip 1 by the forceps 65, etc., as shown in FIG. 11, by holding the side surfaces 3c of the substrate 3 along the region 3e with the comparatively large width $L_2$, the damaging of the optical waveguide layer 5 can be prevented more effectively.

In the first embodiment, the optical waveguide layer 5 may be arranged to contain a polymer. In a conventional optical waveguide chip (see, for example, FIG. 2), when an optical waveguide layer contains a polymer, since the optical waveguide layer is then soft compared to a substrate, the optical waveguide layer peels readily due to chipping in the process of cutting the wafer. Also, though in order to prevent the mixing in of voids (cavities) into a branching portion of the core portion and other narrow portions in the process of laminating the upper cladding layer, it is preferable to laminate the upper cladding layer thickly, this causes the optical waveguide layer to peel even more readily due to chipping in the process of cutting the wafer. In contrast, in the optical waveguide chip 1 according to the first embodiment, even when the optical waveguide layer 5 contains a polymer, the peeling of the optical waveguide layer 5 is avoided or suppressed favorably.

MODIFIED EXAMPLE

Figure 13:
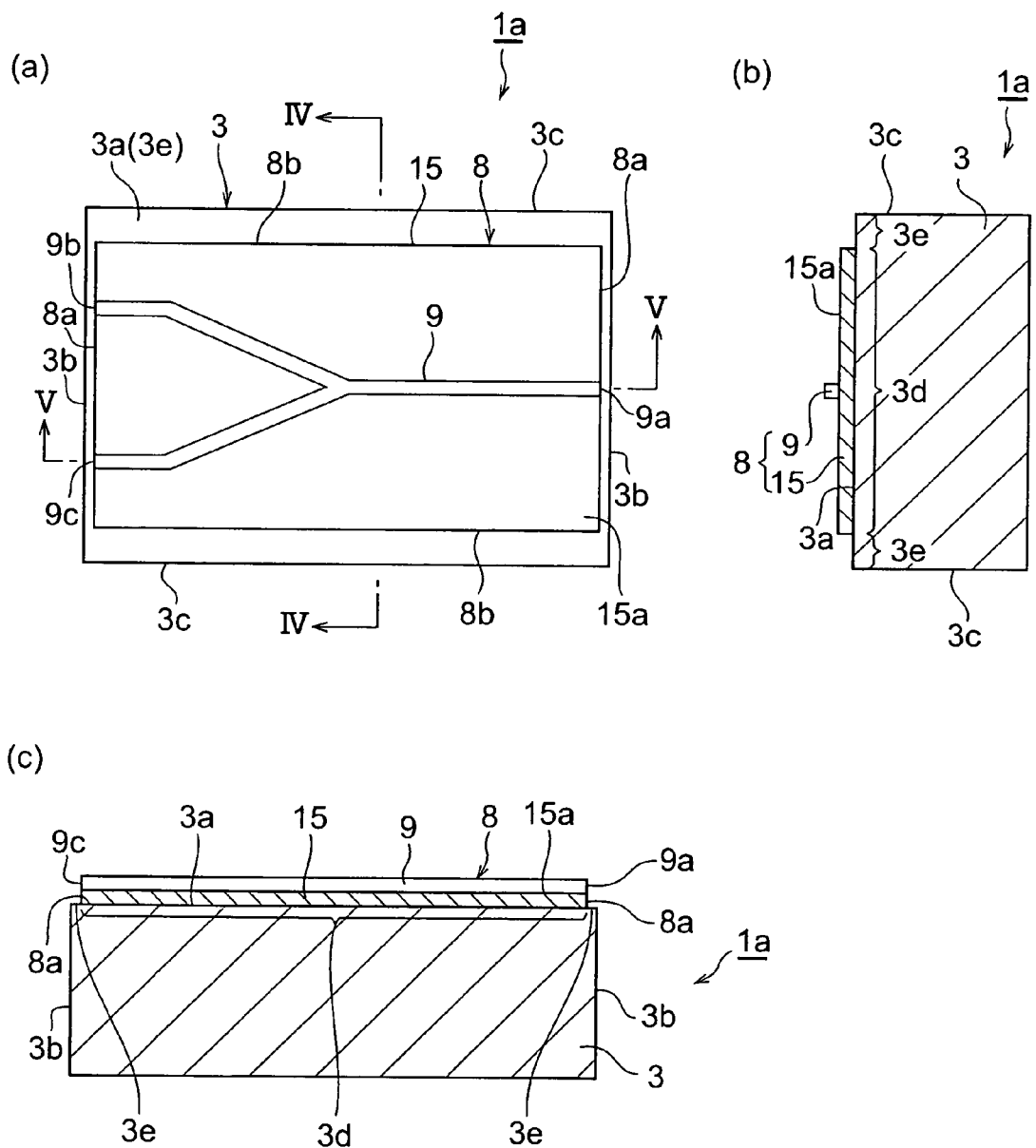
FIG. 13 shows diagrams of an arrangement of a Modified Example of the optical waveguide chip according to the first embodiment.

FIG. 13 shows diagrams of an arrangement of a Modified Example of the optical waveguide chip according to the first embodiment. The area (a) of FIG. 13 shows a plan view of the optical waveguide chip 1a according to the Modified Example of the first embodiment, and the area (b) of FIG. 13 shows a sectional view of the optical waveguide chip 1a along a section IV-IV in the area (a) of FIG. 13. The area (c) of FIG. 13 is a sectional view of the optical waveguide chip 1a along a section V-V in the area (a) of FIG. 13. The section V-V is set along a core portion 9 provided in the optical waveguide chip 1a. The optical waveguide chip 1a according to this Modified Example differs from the optical waveguide chip 1 according to the first embodiment in the shape of the optical waveguide layer. That is, whereas the optical waveguide layer 5 of the first embodiment is of an embedded type, an optical waveguide layer 8 according to this Modified Example is of a ridge type. The arrangement of the substrate 3 in this Modified Example is the same as the arrangement of the substrate 3 in the first embodiment.

Referring now to the areas (a) to (c) of FIG. 13, the optical waveguide layer 8 of this Modified Example uses the same material as that of the optical waveguide layer 5 according to the first embodiment and is disposed on the region 3d of the main surface 3a of the substrate 3. That is, the optical waveguide layer 8 is disposed on the region of the main surface 3a of the substrate 3 besides the region 3e, and the region 3e is not covered by the optical waveguide layer 8. The optical waveguide layer 8 has a rectangular planar shape and has a pair of side surfaces 8a and another pair of side surfaces 8b. The side surfaces 8a and 8b of the optical waveguide layer 8 are respectively disposed nearer the center of the substrate 3 than are the side surfaces 3b and 3c of the substrate 3. The optical waveguide layer 8 has the core portion 9 and a cladding portion 15. The cladding portion 15 is formed as a layer on the region 3d. The core portion 9 is disposed on a top surface 15a of the cladding portion 15. The core portion 9 has a Y-like planar shape that joins the pair of side surfaces 8a of the optical waveguide layer 8, and of the pair of side surfaces 8a, a light entry/exit end 9a is provided at one of the side surfaces 8a and two light entry/exit ends 9b and 9c are provided at the other side surface 8a.

As with the optical waveguide chip 1 according to the first embodiment, the optical waveguide chip 1a according to this Modified Example provides the following effects. That is, with in optical waveguide chip 1a, since side surfaces 8a and 8b of the optical waveguide layer 8 are disposed nearer the center of the substrate 3 than are the side surfaces 3b and 3c of the substrate 3 and the region 3e that is not covered by the optical waveguide layer 8 is present adjacent the edges of the main surface 3a, even if nicks and cracks form due to chipping at the edges of the main surface 3a in the process of cutting a wafer, on which the optical waveguide layer 8 has been formed, into chip units, the effects of the nicks and cracks do not reach the optical waveguide layer 8 readily. Thus, in the optical waveguide chip 1a according to this Modified Example, the peeling of the optical waveguide layer 8 in the process of cutting the wafer is avoided or suppressed favorably. The arrangement in which the side surfaces of the optical waveguide layer are disposed toward the center of the substrate can thus be applied not only to the embedded type optical waveguide chip 1 but also to the ridge type optical waveguide chip 1a. The arrangement in which the side surfaces of the optical waveguide layer are disposed toward the center of the chip can be applied to other types of optical waveguide chips as well as the optical waveguide chips are of a structure in which an optical waveguide layer is formed on a substrate.

Second Embodiment

Figure 14:
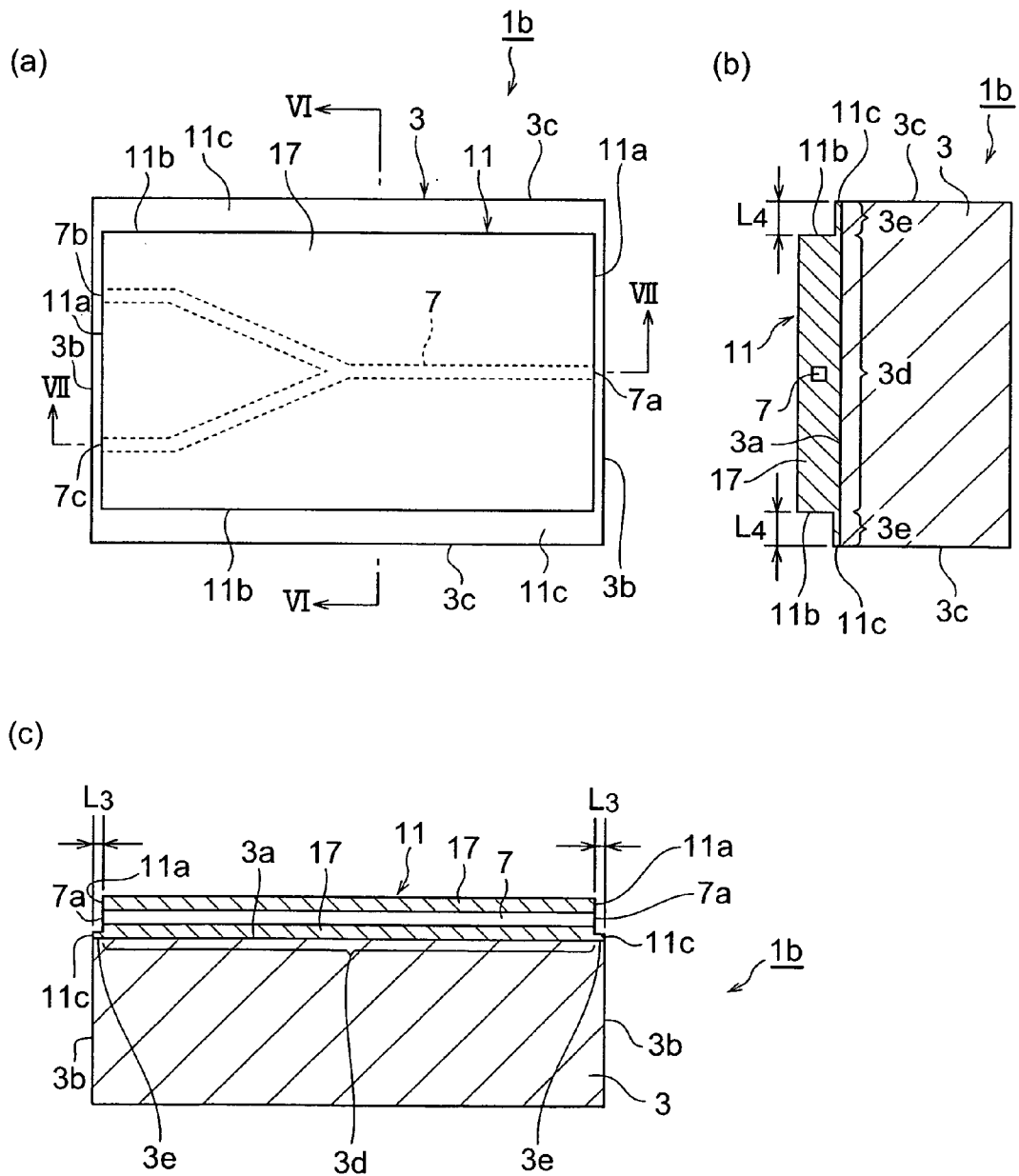
FIG. 14 shows diagrams of an arrangement of a second embodiment of an optical waveguide chip according to the present invention.

A second embodiment of an optical waveguide chip and a method of manufacturing the same according to the present invention will now be explained. FIG. 14 shows diagrams of an arrangement of a second embodiment of an optical waveguide chip according to the present invention. The area (a) of FIG. 14 shows a plan view of the optical waveguide chip 1b according to the second embodiment, and the area (b) of FIG. 14 shows a sectional view of the optical waveguide chip 1b along a section VI-VI in the area (a) of FIG. 14. The area (c) of FIG. 14 is a sectional view of the optical waveguide chip 1b along a section VII-VII in the area (a) of FIG. 14. The section VII-VII is set along the core portion 7 provided in the optical waveguide chip 1b. In the second embodiment, since the arrangement of the substrate 3 is the same as the arrangement of the substrate 3 in the first embodiment, the arrangement of the second embodiment will be explained with reference to FIG. 4, which has been described already.

Referring now to the areas (a) to (c) of FIG. 14 and FIG. 4, the optical waveguide chip 1b according to the second embodiment has the substrate 3 and an optical waveguide layer 11. The optical waveguide layer 11 is disposed on the main surface 3a of the substrate 3. The optical waveguide layer 11 has a thin film portion 11c on the region 3e of the main surface 3a, and the thickness of the thin film portion 11c is thinner than other portions of the optical waveguide layer 11. Of the optical waveguide layer 11, a portion disposed on the region 3d of the main surface 3a is formed to a rectangular shape having a pair of side surfaces 11a and another pair of side surfaces 11b. The side surfaces 11a and 11b are thus respectively positioned nearer the center of the substrate 3 than are the side surfaces 3b and 3c of the substrate 3. In other words, the side surfaces 11a and 11b are respectively disposed at positions that are set back from the side surfaces 3b and 3c of the substrate 3.

The optical waveguide layer 11 has a cladding portion 17 and a core portion 7 with a higher refractive index than the cladding portion 17. The cladding portion 17 is formed as a layer on the region 3d of the main surface 3a of the substrate 3 and also makes up the thin film portion 11c on the region 3e. The core portion 7 is formed inside the cladding portion 17. Since the arrangement and shape of the core portion 7 are the same as the arrangement and shape of the core portion 7 in the first embodiment, detailed description thereof shall be omitted. The material making up the optical waveguide layer 11 is also the same as that of the optical waveguide layer 5 in the first embodiment.

Figure 15:
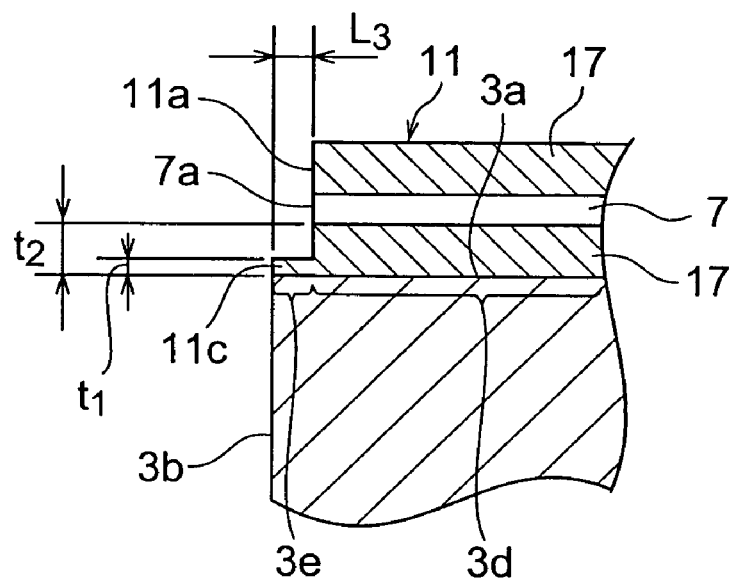
FIG. 15 shows diagrams of structures near side surfaces of the optical waveguide chip according to the second embodiment.
Figure 15:
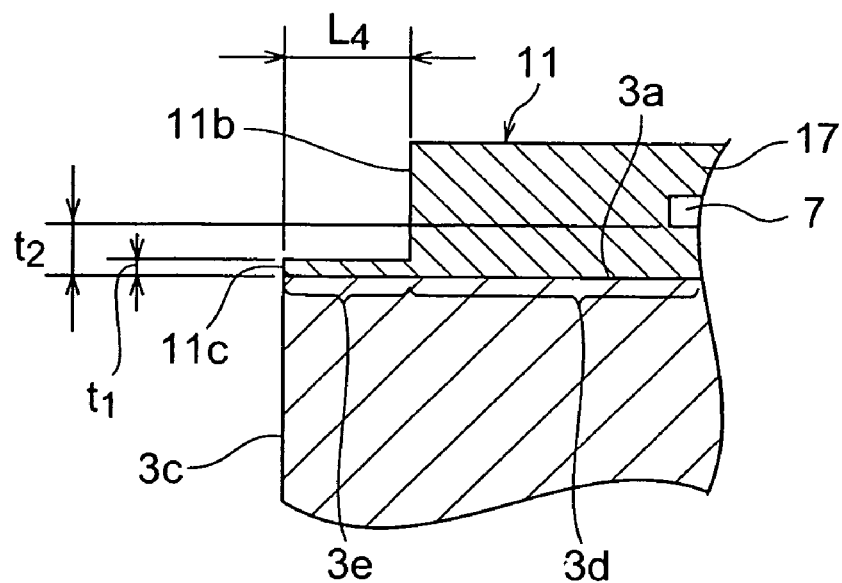

Here, the area (a) of FIG. 15 is an enlarged sectional view of a portion near a side surface 11a of the optical waveguide layer 11. The area (b) of FIG. 15 is an enlarged sectional view of a portion near a side surface 11b of the optical waveguide layer 11. Referring now to these areas (a) and (b) of FIG. 15, a width $L_3$, from the edge of the main surface 3a, of the thin film portion 11c along the side surfaces 11a of the optical waveguide layer 11 with the light entry/exit ends 7a to 7c of the core portion 7 is set smaller than a width $L_4$, from the edge of the main surface 3a, of the thin film portion 11c along the other side surfaces 11b. In other words, the setback width $L_3$ of each of the side surfaces 11a of the optical waveguide layer 11 having the light entry/exit ends 7a to 7c of the core portion 7, with respect to the corresponding side surface 3b of the substrate 3 is set to be less than the setback width $L_4$ of each of other side surfaces 11b with respect to the corresponding side surface 3c. A thickness $t_1$ of the thin film portion 11c is set smaller than an interval $t_2$ between the core portion 7 and the substrate 3. In other words, the thickness of the thin film portion 11c is thinner than a lower cladding layer 19a (see FIG. 6) that is layered on the substrate 3 during the manufacture of the optical waveguide chip 1b. As a numerical value of the thickness $t_1$ of the thin film portion 11c, for example, when the interval $t_2$ between the core portion 7 and the substrate 3 is 20 to 50 μm, preferably, $t_1$<20 μm. More preferably, when $t_2$=20 to 50 μm, $t_1$<5 μm.

A method of manufacturing the optical waveguide chip 1 according to the second embodiment will now be explained with reference to FIGS. 16 to 18. The wafer product 10 (see FIGS. 5 and 6), described with the first embodiment, is used in the second embodiment as well.

Figure 16:
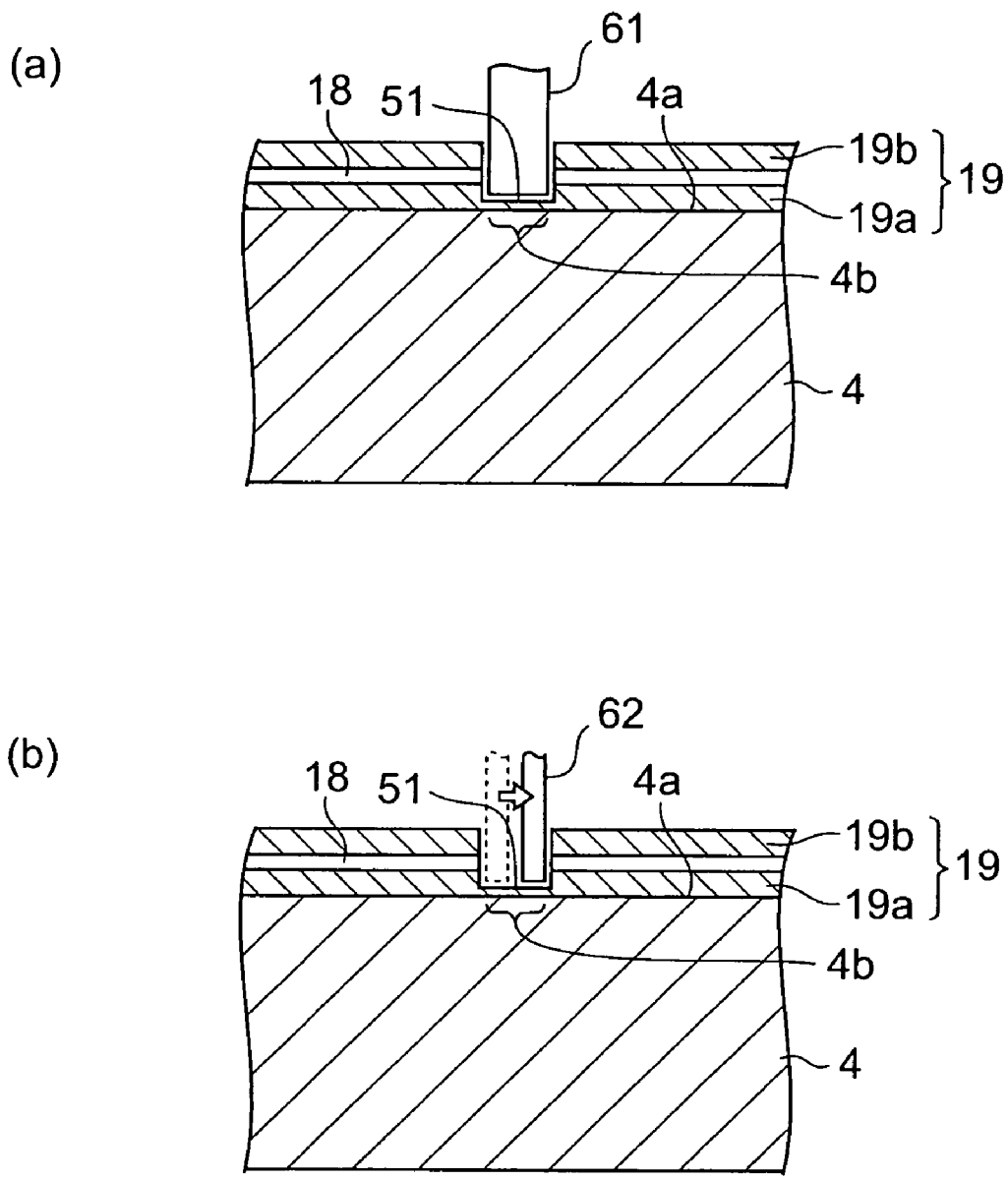
FIG. 16 shows diagrams for explaining an example of manufacturing the optical waveguide chip according to the second embodiment (Part 1)

First, as shown in the area (a) of FIG. 16, grooves, each having a bottom at the lower clad 19a, are formed by the dicing blade 61 to form thin film portions 51 that are thinner than the lower cladding layer 19a. In this process, each thin film portion 51 is formed so that the thin film portion 51 is positioned on a region 4b of the main surface 4a of the wafer 4. Thus, as the dicing blade 61, a dicing blade with a thickness 5 that is in accordance with the width of each region 4b of the main surface 4a may be used. Or, the thin dicing blade 62 may be used as shown in the area (b) of FIG. 16. In this case, the thin film portions 51 having the width that is in accordance with the width of each region 4b can be formed by repeating dicing upon moving the dicing blade 62 in the width direction of the region 4b.

Figure 17:
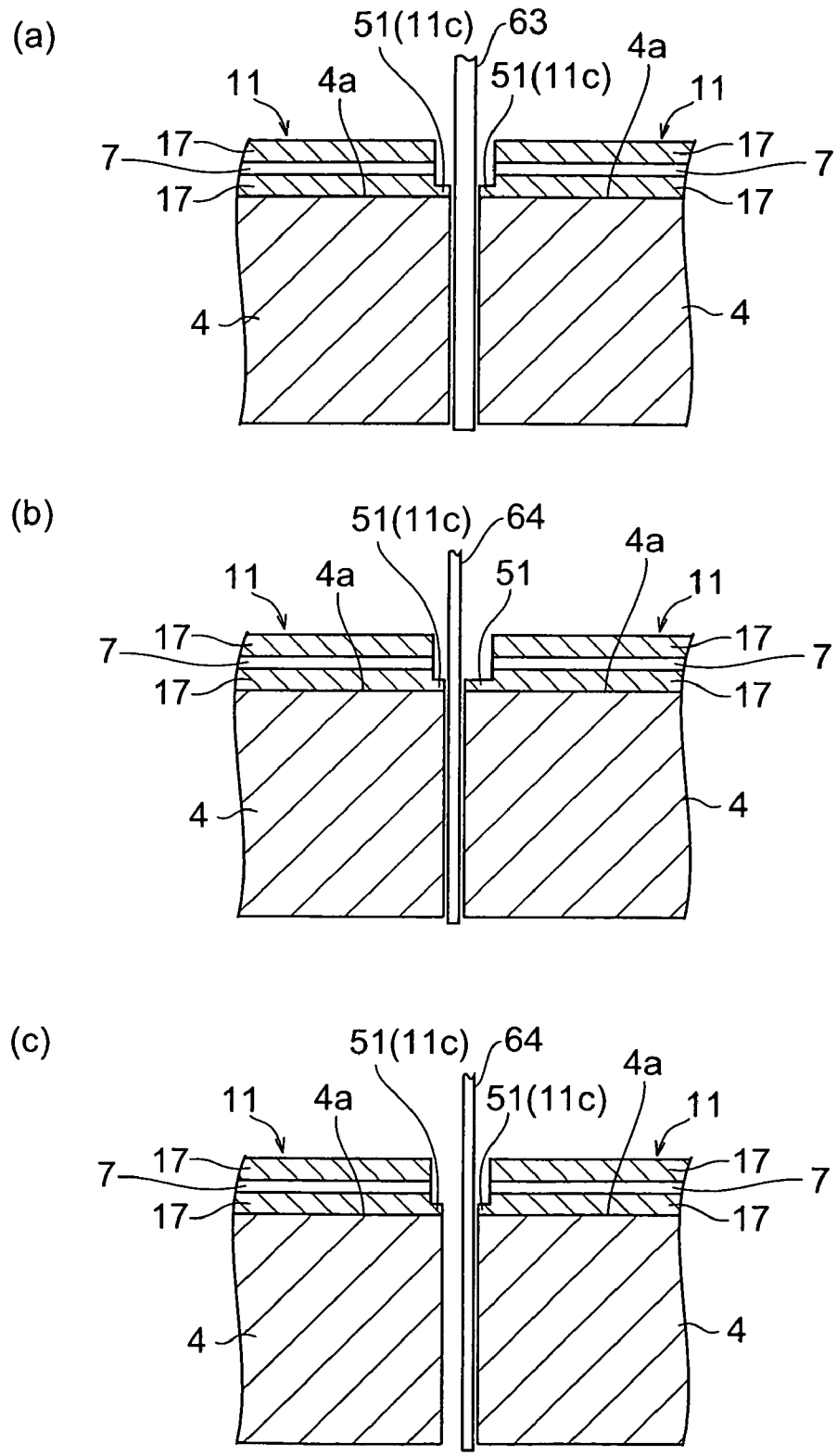
FIG. 17 shows diagrams for explaining the example of manufacturing the optical waveguide chip according to the second embodiment (Part 2)

The wafer 4 is cut using the dicing blade 63 that is thinner than the dicing blade 61 as shown in the area (a) of FIG. 17. In this process, the wafer 4 is cut so as to partition the thin film portions 51 (see the areas (a) and (b) of FIG. 16) along the scheduled cutting lines A. Or, the wafer 4 may be cut using the thin dicing blade 64 as shown in the areas (b) and (c) of FIG. 17. In this case, after cutting of the wafer 4 (see the area (b) of FIG. 17), the cutting of the wafer 4 is repeated upon moving the dicing blade 64 in the width direction of each region 4b to partition the corresponding thin film portion 51 at an arbitrary width (see the area (c) of FIG. 17). The wafer 4 is thus cut along the scheduled cutting lines A (see FIG. 5), and the optical waveguide chips 1b, each having the substrate 3 and the optical waveguide layer 11, are completed. By being partitioned, each thin film portion 51 becomes the thin film portions 11c of the corresponding optical waveguide chips 1.

Another method of manufacturing the optical waveguide chips 1b will now be explained with reference to FIG. 18. The steps described here correspond to the steps of the above-described manufacturing method illustrated in the areas (a) and (b) of FIG. 16, and the other steps are the same as those of the above-described manufacturing method.

Figure 18:
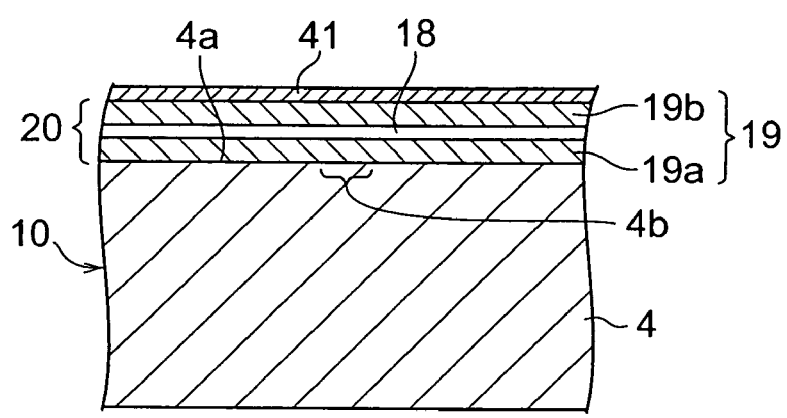
FIG. 18 shows diagrams for explaining another example of manufacturing the optical waveguide chip according to the second embodiment.
Figure 18:
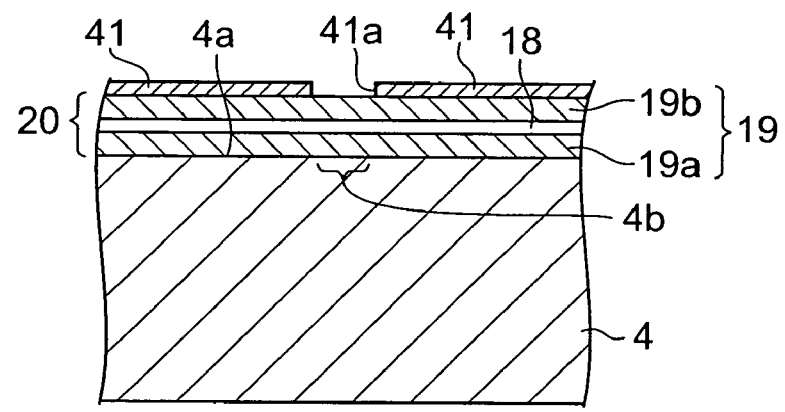
Figure 18:
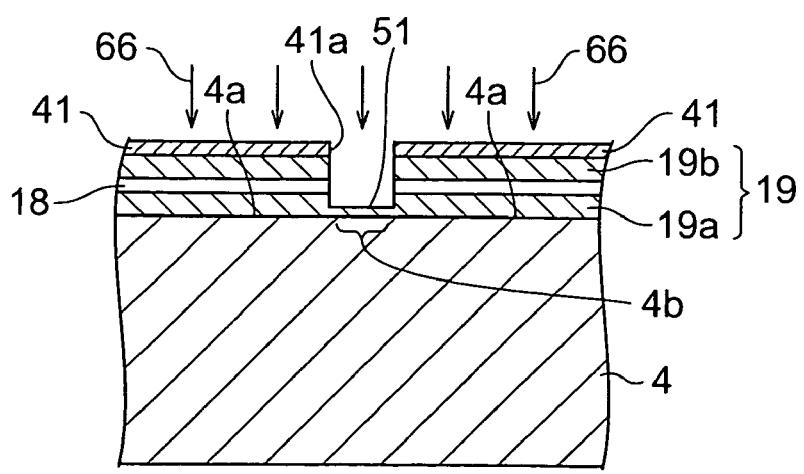

First, as shown in the area (a) of FIG. 18, the mask 41 is formed on the upper cladding layer 19b of the wafer product 10. The portions of the mask 41 that correspond to the regions 4b of the main surface 4a of the wafer 4 are then removed as shown in the area (b) of FIG. 18 to form the openings 41a in the mask 41. In this process, each opening 41a is formed so that its width is substantially the same as the width of a region 4b.

Of the optical waveguide layer 20, the portions that are not covered by the mask 41 (that is, the portions corresponding to the openings 41a) are removed to a depth reaching the lower cladding layer 19a, as shown in the area (c) of FIG. 18, by a dry etching method, such as reactive ion etching, with which ions 66 that are induced by discharge of a reactive gas are made to collide from the main surface 4a side of the wafer 4. By grooves, each having a bottom at the lower cladding layer 19a, thus being formed, the thin film portions 51 that are thinner than the lower cladding layer 19a are formed.

Subsequently, via the same steps (see the areas (a) to (c) of FIG. 17) as the above-described manufacturing method, the optical waveguide chips 1b, each having the substrate 3 and the optical waveguide layer 11, are completed.

Effects of the optical waveguide chip 1b according to the second embodiment will now be explained. With the optical waveguide chip 1b according to the second embodiment, the side surfaces 11a and 11b of the optical waveguide layer 11 are respectively positioned nearer the center of the substrate 3 than are the side surfaces 3b and 3c of the substrate 3. By this structure, even if nicks and cracks due to chipping form at the edges of the main surface 3a, that is, at the cut portions of the wafer 4, on which the optical waveguide layer 20 has been formed, in the process of cutting the wafer 4 into chip units, the peeling of the optical waveguide layer 11 is avoided or suppressed effectively.

Figure 19:
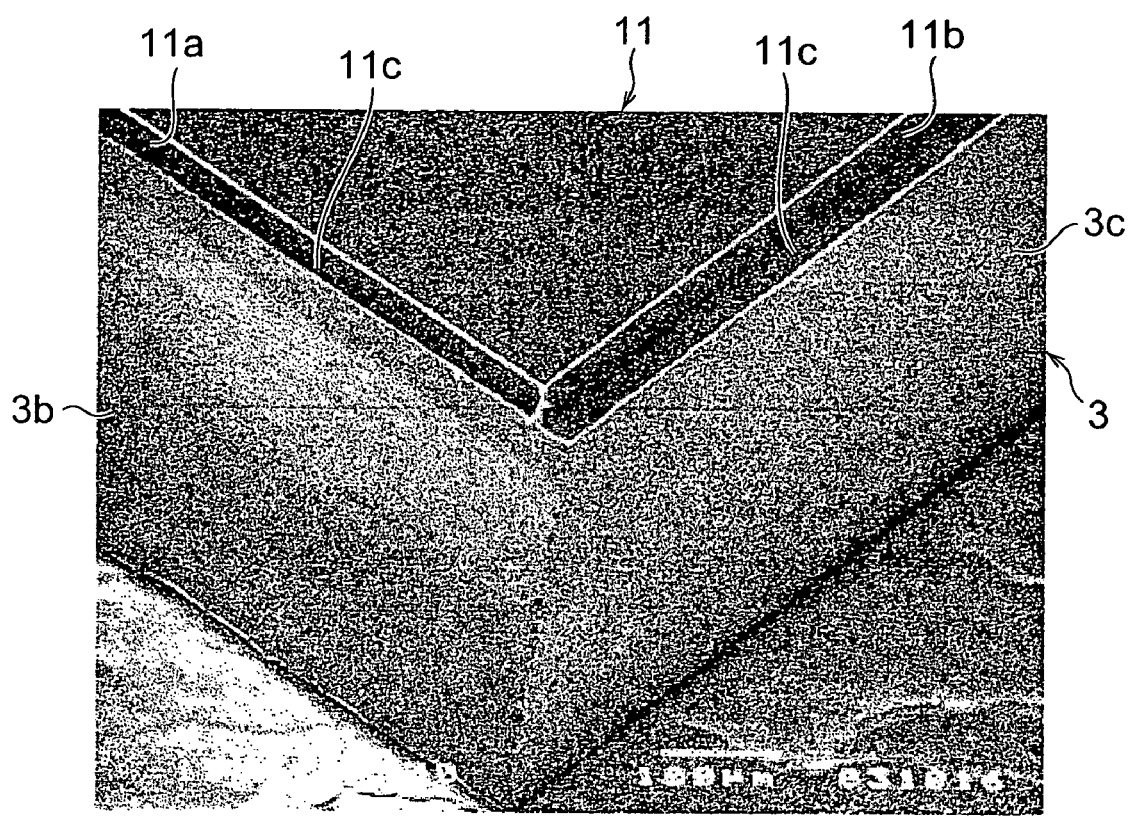
FIG. 19 is a photograph of a portion of an outer appearance of the optical waveguide chip according to the second embodiment as taken from obliquely above.
Figure 20:
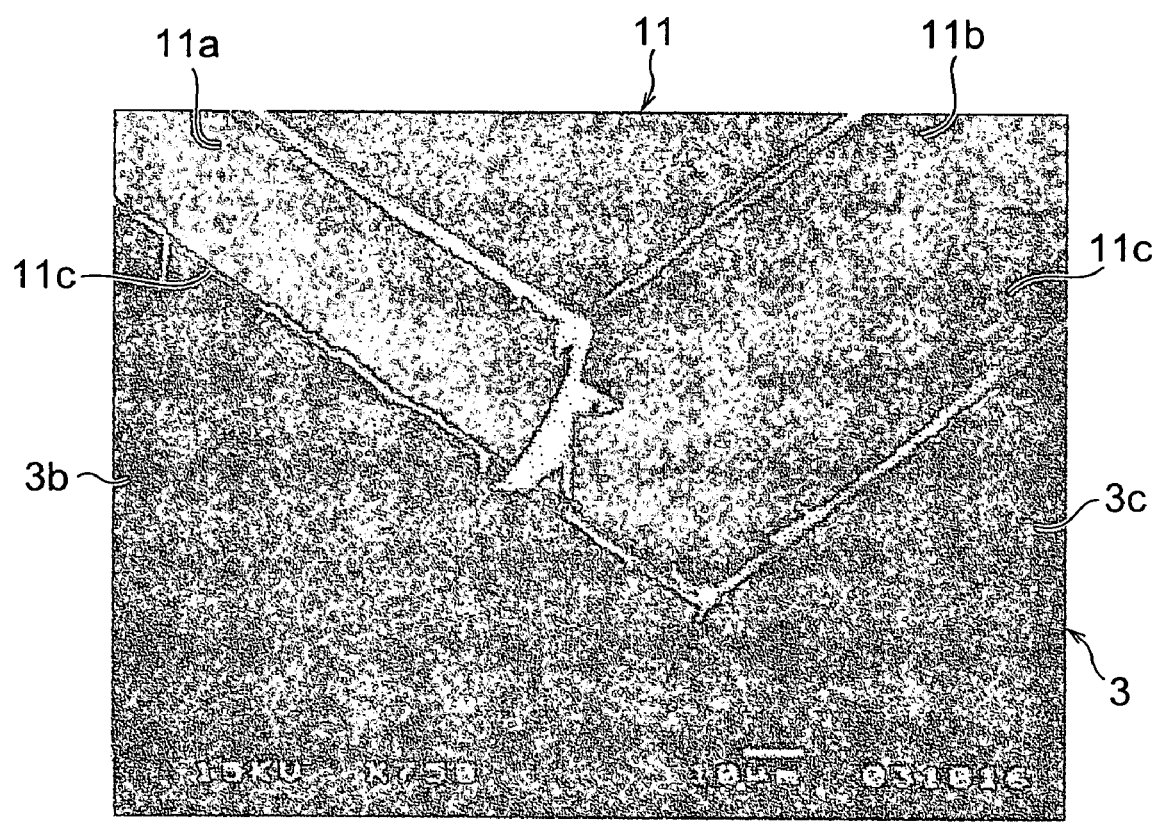
FIG. 20 is an enlarged photograph of a portion of the photograph of FIG. 19.
Figure 21:
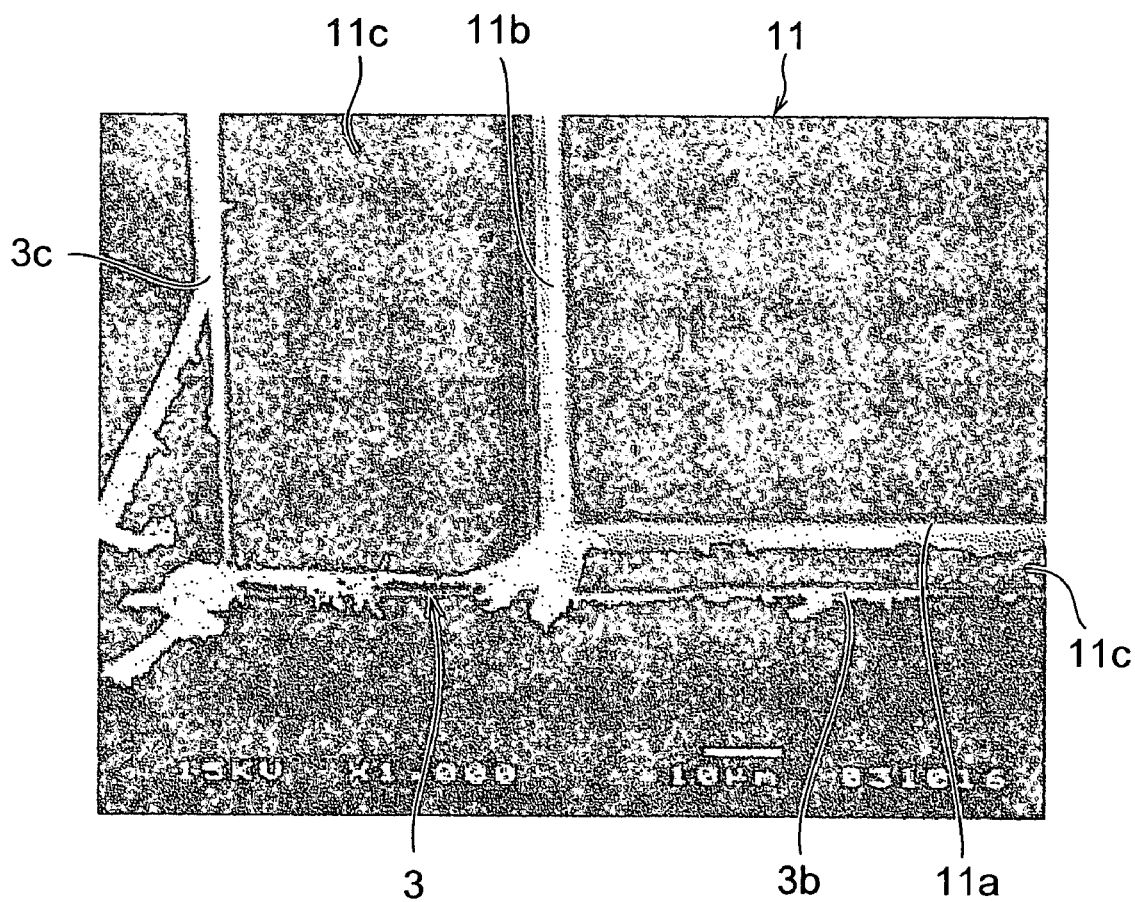
FIG. 21 is a photograph of a portion of an outer appearance of the optical waveguide chip according to the second embodiment as taken from above.
Figure 22:
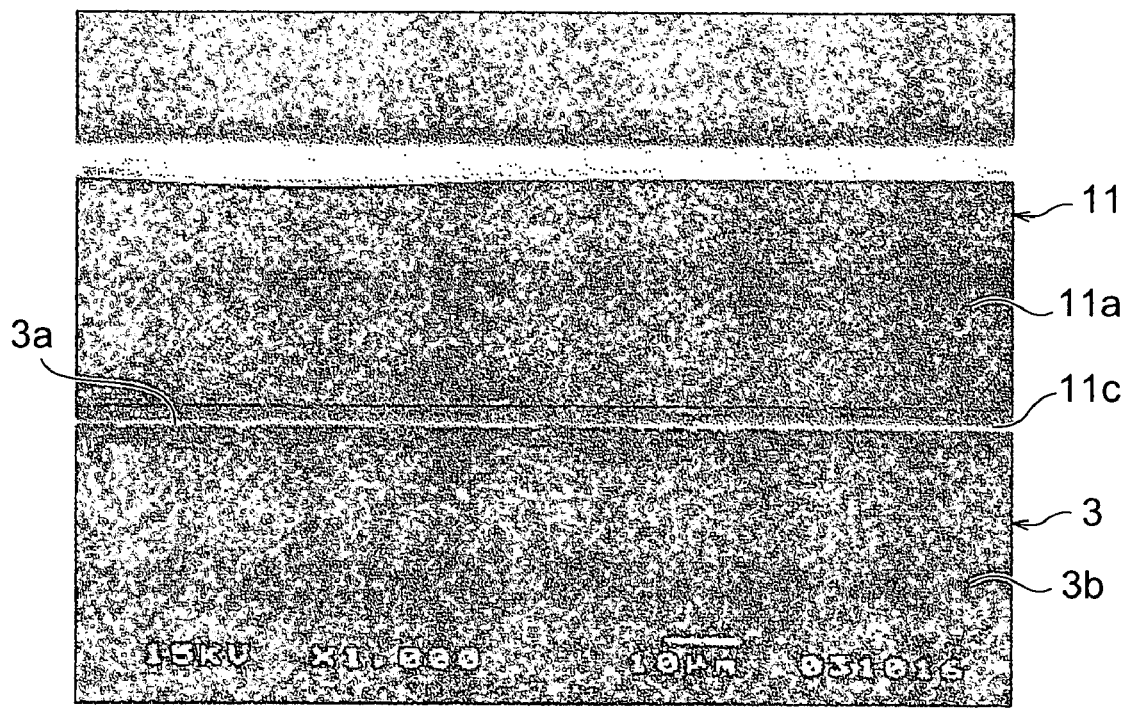
FIG. 22 is a photograph of a portion of an outer appearance of the optical waveguide chip according to the second embodiment as taken from a side.

FIGS. 19 to 22 are photographs that actually show the above-described effect of the optical waveguide chip 1b and the method of manufacturing the same. FIG. 19 is a photograph of a portion of an outer appearance of the optical waveguide chip 1b as taken from obliquely above, and FIG. 20 is an enlarged photograph of a portion of the photograph of FIG. 19. FIG. 21 is a photograph of a portion of the outer appearance of the optical waveguide chip 1b as taken from above, and FIG. 22 is a photograph of a portion of the outer appearance of the optical waveguide chip 1b as taken from a side.

As can be understood from FIGS. 19 to 22, in the optical waveguide chip 1b according to the second embodiment, by the side surfaces 11a and 11b of the optical waveguide layer 11 being disposed nearer the center of the chip than are the side surfaces 3b and 3c of the substrate 3, the peeling of the optical waveguide layer 11 is avoided effectively. In particular, as can be understood from the photograph of FIG. 22, even though chipping C occurs at an edge of the main surface 3a of the substrate 3, the peeling of the optical waveguide layer 11 is suppressed effectively.

The optical waveguide chip 1b according to the second embodiment provides the following effects. That is, when the optical waveguide chip 1b and an optical fiber or other optical transmission line are connected to each other, spaces adjacent the side surfaces 11a and 11b serve roles of adhesive agent reservoirs that enable good coupling of the optical fiber and the optical waveguide chip 1b. Also, since the side surfaces 11a and 11b of the optical waveguide layer 11 are disposed nearer the chip center than are the side surfaces 3b and 3c of the substrate 3, damaging of the optical waveguide layer 11 when holding the optical waveguide chip 1b by forceps, etc., is prevented.

In the second embodiment, the optical waveguide layer 11 on the region 3e adjacent the edges of the main surface 3a is the thin film portion 11c. The present inventors have found that the thinner the optical waveguide layer near portions that are cut during wafer cutting, the less likely it is for the optical waveguide layer to become peeled from the wafer top surface during wafer cutting. As one reason, it can be cited that since the substrate and the optical waveguide layer differ in thermal expansion coefficient, the thinner the optical waveguide layer, the lower the stress difference and the less likely it is for peeling to occur. Thus, in the optical waveguide chip 1b according to the second embodiment, since the optical waveguide layer 11 on the region 3e adjacent the edges of the main surface 3a is the thin film portion 11c, even if nicks and cracks due to chipping form at the edges of the main surface 3a, that is, at the cut portions of the main surface 4a of the wafer 4, on which the optical waveguide layer 20 has been formed, in the process of cutting the wafer 4 into chip units, the peeling of the optical waveguide layer 11 is avoided or suppressed favorably.

In the optical waveguide chip 1b according to the second embodiment and the method of manufacturing the same, since the 5 cutting of the wafer 4, on which the optical waveguide layer 20 has been formed, is performed so as to partition the thin film portions 51, even if nicks and cracks form in the wafer 4 due to chipping, the peeling of the optical waveguide layer 11 is avoided or suppressed favorably.

In the second embodiment, the thickness $t_1$ of the thin film portion 11c is less than the interval $t_2$ between the core portion 7 and the main surface 3a. As a result of diligent research, the inventors found a preferable thickness of the thin film portion 11c. That is, by the thickness $t_1$ of the thin film portion 11c being set less than the interval $t_2$, the peeling of the optical waveguide layer 11 due to chipping of the substrate 3 can be suppressed more effectively.

In the second embodiment, the width $L_3$, from the edges of the main surface 3a, of the thin film portion 11c along the side surfaces 11a of the optical waveguide layer 11 that are provided with the light entry/exit ends 7a to 7c of the core portion 7 is less than the width $L_4$, from the edges of the main surface 3a, of the thin film portion 11c along the other side surfaces 11b of the optical waveguide layer 11. By this arrangement, when the light entry/exit ends 7a to 7c of the core portion 7 and optical fibers or other optical parts are coupled, the distances between the side surfaces of the optical parts in contact with the side surfaces 3b of the substrate 3 and the light entry/exit ends 7a to 7c are shortened and coupling losses are reduced. Also, in holding the optical waveguide chip 1b by forceps, etc., by holding the side surfaces 3c of the substrate 3 along the thin film portion 11c of comparatively large width from the edges of the main surface 3a, damaging of the optical waveguide layer 11 is prevented more effectively.

MODIFIED EXAMPLE

Figure 23:
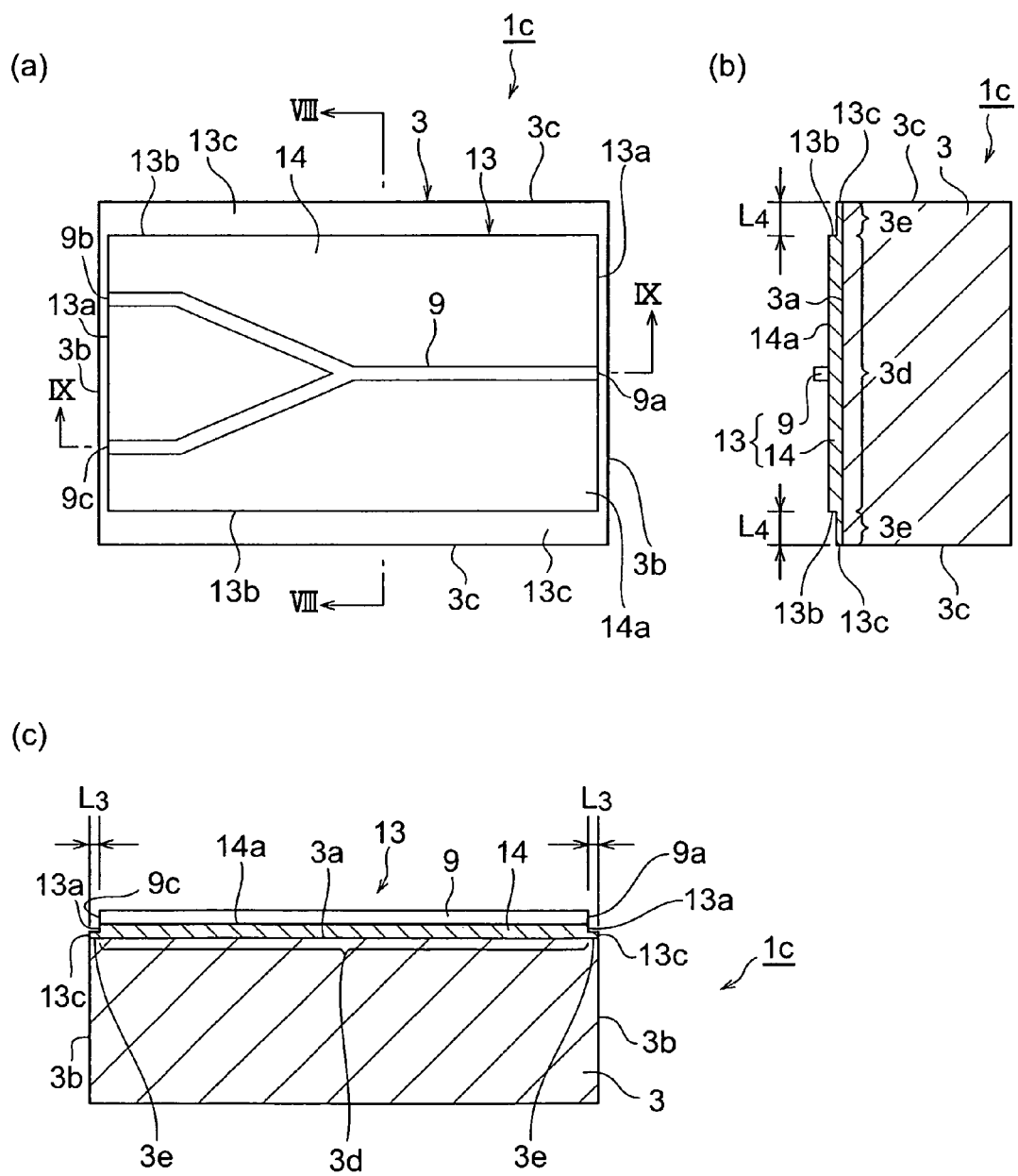
FIG. 23 shows diagrams of an arrangement of a Modified Example of the optical waveguide chip according to the present invention.

FIG. 23 shows diagrams of an optical waveguide chip 1c according to a Modified Example of the second embodiment. The area (a) of FIG. 23 being a plan view of the optical waveguide chip 1c according to the Modified Example, and the area (b) of FIG. 23 being a sectional view of the optical waveguide chip 1c along a section VIII-VIII in the area (a) of FIG. 23. The area (c) of FIG. 23 is a sectional view of the optical waveguide chip 1c along a section IX-IX in the area (a) of FIG. 23. The section IX-IX is set along the core portion 9 provided in the optical waveguide chip 1c. The optical waveguide chip 1c according to this Modified Example differs from the optical waveguide chip 1b according to the second embodiment in the shape of the optical waveguide layer. That is, whereas the optical waveguide layer 11 of the second embodiment is of an embedded type, an optical waveguide layer 13 according to this Modified Example is of a ridge type. The arrangement of the substrate 3 in this Modified Example is the same as the arrangement of the substrate 3 in the first embodiment.

Referring now to the areas (a) to (c) of FIG. 23, the optical waveguide layer 13 of this Modified Example uses the same material as that of the optical waveguide layer 11 in the second embodiment and is disposed on the main surface 3a of the substrate 3. That is, of the optical waveguide layer 13, the thin film portion 13c is disposed on the region 3e of the main surface 3a, and the other portion is disposed on the region 3d of the main surface 3a. Of the optical waveguide layer 13, the portion disposed on the region 3d has a rectangular planar shape and has a pair of side surfaces 13a and another pair of side surfaces 13b. The side surfaces 13a and 13b of the optical waveguide layer 13 are respectively disposed nearer the center of the substrate 3 than are the side surfaces 3b and 3c of the substrate 3. The optical waveguide layer 13 has the core portion 9 and a cladding portion 14. The cladding portion 14 is formed as a layer on the region 3d of the main surface 3a and a portion thereof makes up the thin film portion 13c on the region 3e. The core portion 9 is disposed on a top surface 14a of the cladding portion 14. The core portion 9 has a Y-like planar shape that joins the pair of side surfaces 13a of the optical waveguide layer 13, and of the pair of side surfaces 13a, the light entry/exit end 9a is provided at one of the side surfaces 13a and the two light entry/exit ends 9b and 9c are provided at the other side surface 13a.

As with the optical waveguide chip 1b according to the second embodiment, the optical waveguide chip 1c according to this Modified Example provides the following effects. That is, in the optical waveguide chip 1c, since the side surfaces 13a and 13b of the optical waveguide layer 13 are disposed nearer the center of the substrate 3 than are the side surfaces 3b and 3c of the main surface 3 and the optical waveguide layer 13 on the region 3e adjacent the edges of the main surface 3a is arranged as the thin film portion 13c, even if nicks and cracks form due to chipping at the edges of the main surface 3a in the process of cutting a wafer, on which the optical waveguide layer 13 has been formed, into chip units, the peeling of the optical waveguide layer 13 is avoided or suppressed favorably.

The optical waveguide chip and method of manufacturing the same according to the present invention is not restricted to the above-described embodiments and Modified Examples, and various other modifications are possible. For example, the planar shape of the core portion is not restricted to a Y-like shape as in the first and second embodiments, and the core portion may be formed to any of various planar shapes as necessary. Also, the planar shape of the optical waveguide chip may be any of various polygonal shapes besides a rectangular shape as in the embodiments described above.

Though in the first and second embodiments, all four side surfaces of the optical waveguide layer are disposed nearer the chip center than are the substrate side surfaces, at least a portion of side surfaces, among the side surfaces of the optical waveguide layer, may be disposed nearer the chip center than are the substrate side surfaces corresponding to the relevant side surfaces. Also, the region (region 3e) adjacent the edges of the main surface may be set, for example, so as to be adjacent to just a portion of the edges of the main surface instead of being set adjacent all of the edges of the main surface as in the embodiments described above.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The optical waveguide chip according to the present invention can be applied as an optical part that branches or couples light propagating through optical transmission media, such as optical fibers.

The invention claimed is:

1. An optical waveguide chip comprising:
a substrate having a main surface; and
an optical waveguide layer formed on the main surface of the substrate, the optical waveguide layer having a core portion that guides light and a cladding portion, the cladding portion including a central portion, at least a part of which is positioned between the substrate and the core portion, and a thin film portion that is positioned at a periphery of the central portion and that covers at least a part of a region of the main surface that includes an edge of the main surface,
wherein the thin film portion is thinner than the central portion
wherein the central portion has first side surfaces coinciding with the light entry/exit ends of the core portion and being apart from all edges of the main surface, and second side surfaces excluding the first side surfaces and being apart from all edges of the main surface, and
wherein, at least a part of the thin film portion is positioned between one of the second side surfaces and the closest edge of the main surface with respect to the one of the second side surfaces, and a stepped portion is provided at an interface between the one of the second side surfaces and the Part of the thin film portion.

2. An optical waveguide chip comprising:
a substrate having a main surface; and
an optical waveguide layer formed on the main surface of the substrate and having a core portion that guides light,
wherein a region of the optical waveguide layer, being in contact with the main surface, has an area of less than an area of the entire main surface of the substrate the optical waveguide layer having first side surfaces coinciding with the light entry/exit ends of the core portion and being apart from all edges of the main surface, and second side surfaces excluding the first side surfaces and being apart from all edges of the main surface,
wherein a region of the main surface of the substrate including an edge of the main surface is not covered by the optical waveguide layer, and
wherein a minimum distance between one of the first side surfaces and the closest edge of the main surface with respect to the one of the first side surfaces is less than a minimum distance between one of the second side surfaces and the closest edge of the main surface with respect to the one of the second side surfaces.

3. An optical waveguide chip according to claim 1, wherein a minimum distance between one of the first side surfaces and the closest edge of the main surface with respect to the one of the first side surfaces is less than a minimum distance between one of the second side surfaces and the closest edge of the main surface with respect to the one of the second side surfaces.

4. An optical waveguide chip according to claim 1, obtained by the steps of:
forming an optical waveguide layer, having a core portion that guides light, on a wafer;
forming a thin film portion, being thinner than a central portion of the optical waveguide layer, on a part of the optical waveguide layer that covers a region including a scheduled cutting line within a top surface of the wafer; and
cutting the wafer so as to partition the thin film portion along the scheduled cutting lines.

5. An optical waveguide chip according to claim 1, wherein the thickness of the thin film portion is less than an interval between the core portion and the main surface.

6. An optical waveguide chip according to claim 1, wherein a width of the thin film portion, positioned between one of the first side surfaces and the closest edge of the main surface with respect to the one of the first side surfaces, is less than a width of the thin film portion, positioned between one of the second side surfaces and the closest edge of the main surface with respect to the one of the second side surfaces.

7. An optical waveguide chip according to claim 1 wherein the optical waveguide layer contains a polymer.

8. An optical waveguide chip according to claim 2 obtained by the steps of:
forming an optical waveguide layer, having a core portion that guides light, on a wafer;
removing a part of the optical waveguide layer that covers a region of a top surface of the wafer that include a scheduled cutting line; and
cutting the wafer so as to partition the region along the scheduled cuffing line.

9. An optical waveguide chip according to claim 2, wherein the optical waveguide layer contains a polymer.

10. An optical waveguide chip comprising:
a substrate having a main surface; and
an optical waveguide layer formed on the main surface of the substrate and having a core portion that guides light, the optical waveguide layer having first side surfaces coinciding with the light entry/exit ends of the core portion and being apart from all edges of the main surface, and second side surfaces excluding the first side surfaces and being apart from all edges of the main surface, wherein a minimum distance between one of the first side surfaces and the closest edge of the main surface with respect to the one of the first side surfaces is less than a minimum distance between one of the second side surfaces and the closest edge of the main surface with respect to the one of the second side surfaces.

11. An optical waveguide chip according to claim 10, obtained by the steps of:
forming an optical waveguide layer, having a core portion that guides light, on a wafer;
removing a part of the optical waveguide layer that covers a region of a top surface of the wafer that include a scheduled cutting line; and
cutting the wafer so as to partition the region along the scheduled cuffing line.

12. An optical waveguide chip according to claim 10, further comprising a thin film portion that is thinner than a central portion of the optical waveguide layer and that covers at least a part of a region including an edge of the main surface within the main surface of the substrate.

13. An optical waveguide chip according to claim 12, obtained by the steps of:
forming an optical waveguide layer, having a core portion that guides light, on a wafer;
forming a thin film portion, being thinner than a central portion of the optical waveguide layer, on a part of the optical waveguide layer that covers a region including a scheduled cutting line within a top surface of the wafer; and
cuffing the wafer so as to partition the thin film portion along the scheduled cutting lines.

14. An optical waveguide chip according to claim 12, wherein the thickness of the thin film portion is less than an interval between the core portion and the main surface.

15. An optical waveguide chip according to claim 12, wherein a width of the thin film portion, positioned between one of the first side surfaces and the closest edge of the main surface with respect to the one of the first side surfaces, is less than a width of the thin film portion, positioned between one of the second side surfaces and the closest edge of the main surface with respect to the one of the second side surfaces.

16. An optical waveguide chip according to claim 10, wherein the optical waveguide layer contains a polymer.

17. An optical waveguide chip according to claim 12, wherein the thin film portion is constituted by a part of the optical waveguide layer.

* * * * *